US008254985B2

(12) United States Patent
Ekicl et al.

(10) Patent No.: US 8,254,985 B2
(45) Date of Patent: Aug. 28, 2012

(54) METHODS AND APPARATUS FOR USE IN CONTROLLING WIRELESS TRANSCEIVER OPERATION IN A MOBILE COMMUNICATION DEVICE

(75) Inventors: Ozgur Ekicl, Kanata (CA); Jean-Philippe Paul Cormier, Kanata (CA); Dimitrios Christos Prodanos, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 360 days.

(21) Appl. No.: 12/612,046

(22) Filed: Nov. 4, 2009

(65) Prior Publication Data

US 2011/0103318 A1 May 5, 2011

(51) Int. Cl.
*H04Q 7/20* (2006.01)
(52) U.S. Cl. ............... 455/550.1; 455/552.1; 455/553.1; 455/551; 455/445; 455/426.1; 370/310; 370/328; 370/329; 370/338; 370/343
(58) Field of Classification Search ............... 455/550.1, 455/552.1, 553.1, 551, 445, 422.1, 403, 426.1, 455/426.2, 432.1–432.3, 435.1, 435.2, 434, 455/67.11, 435.3; 370/310, 328, 329, 338, 370/343
See application file for complete search history.

(56) References Cited

U.S. PATENT DOCUMENTS

| 6,167,268 A | 12/2000 | Souissi et al. |
| 6,275,680 B1 | 8/2001 | Martin et al. |
| 6,556,825 B1 | 4/2003 | Mansfield |
| 7,289,807 B2 | 10/2007 | Jaakkola et al. |
| 2003/0134636 A1 | 7/2003 | Sundar et al. |
| 2004/0137905 A1 | 7/2004 | Jeong et al. |
| 2004/0165563 A1 | 8/2004 | Hsu et al. |
| 2006/0035636 A1 | 2/2006 | Pirila |
| 2006/0166699 A1 | 7/2006 | Aghvami et al. |
| 2007/0021126 A1 | 1/2007 | Nanda et al. |
| 2007/0143499 A1* | 6/2007 | Chang .......................... 709/245 |
| 2007/0237121 A1 | 10/2007 | Khandelwal et al. |
| 2007/0263558 A1 | 11/2007 | Salomone |

(Continued)

FOREIGN PATENT DOCUMENTS

| EP | 0858237 A2 | 8/1998 |
| EP | 1947875 A1 | 6/2008 |
| EP | 1978676 A1 | 10/2008 |

(Continued)

OTHER PUBLICATIONS

Extended European search report, EP application No. 09013860.3, May 19, 2010.

*Primary Examiner* — Keith Ferguson
(74) *Attorney, Agent, or Firm* — John J. Oskorep, Esq.

(57) ABSTRACT

A While a mobile device operates for communications in a WWAN, its WLAN transceiver portion may be maintained in a low power state. During the WWAN operation, the mobile device performs one or more scanning operations with use of a WWAN transceiver portion for identifying a current set of cell site identifications corresponding to a currently-serving base station of the WWAN and one or more neighboring base stations. The mobile device compares cell site identifications of the current set with those in a stored set, and identifies if the number or percentage of matching cell site identifications of the current and stored sets meets or exceeds a predetermined threshold. If the predetermined threshold is met or exceeded, the mobile device exits the WLAN transceiver portion from the low power state and enables its operation for communications.

26 Claims, 13 Drawing Sheets

| U.S. PATENT DOCUMENTS | | | FOREIGN PATENT DOCUMENTS | | |
|---|---|---|---|---|---|
| 2007/0297358 A1 | 12/2007 | Chang et al. | WO | 2007001689 A1 | 1/2007 |
| 2008/0096580 A1 | 4/2008 | Montemurro | WO | 2009039904 A1 | 4/2009 |
| 2008/0137626 A1 | 6/2008 | Choi et al. | WO | 2009071802 A1 | 6/2009 |
| 2008/0176579 A1 | 7/2008 | Abdel-Kader | WO | 2009071967 A1 | 6/2009 |
| 2008/0198811 A1* | 8/2008 | Deshpande et al. .......... 370/332 | | | |

* cited by examiner

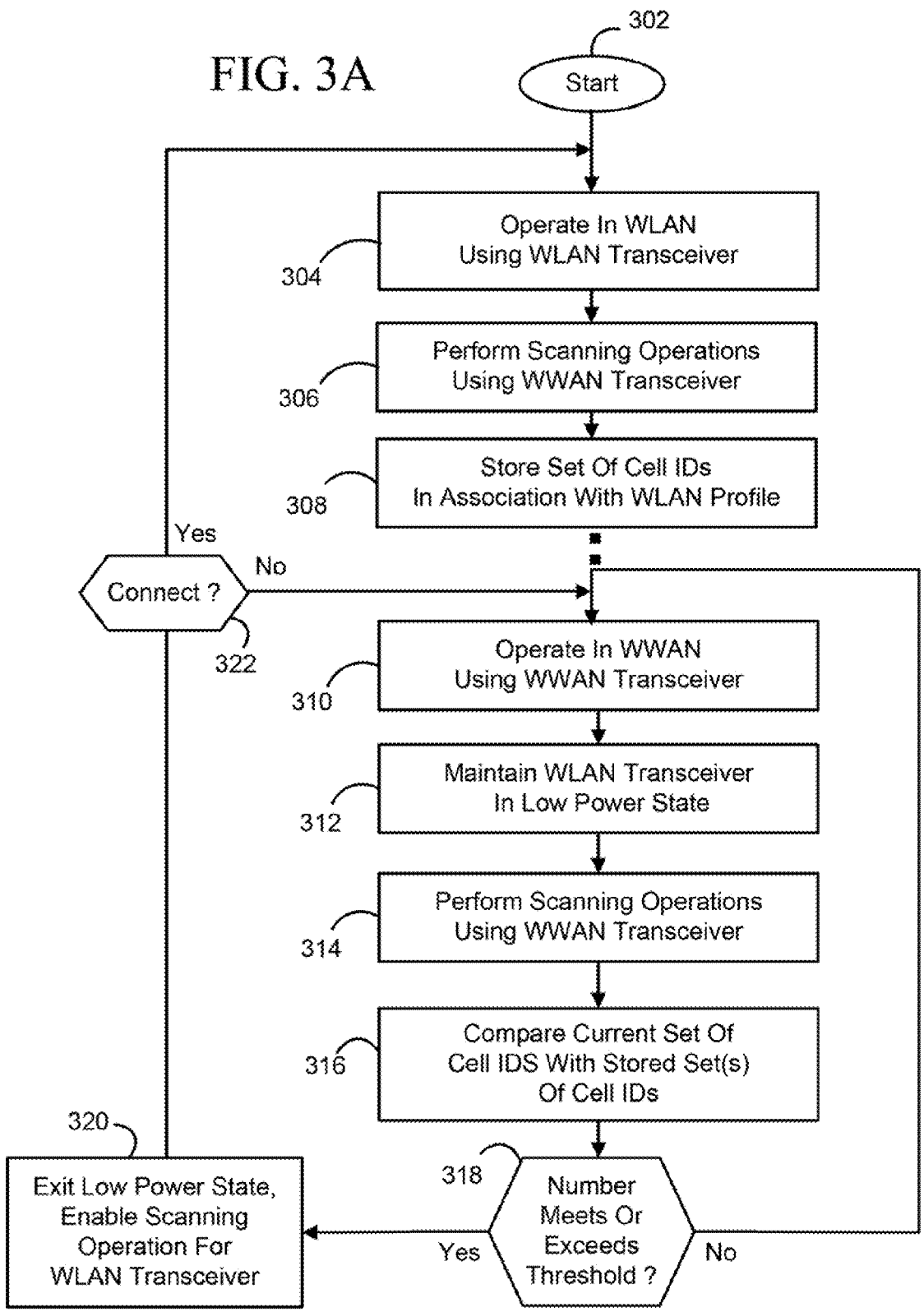

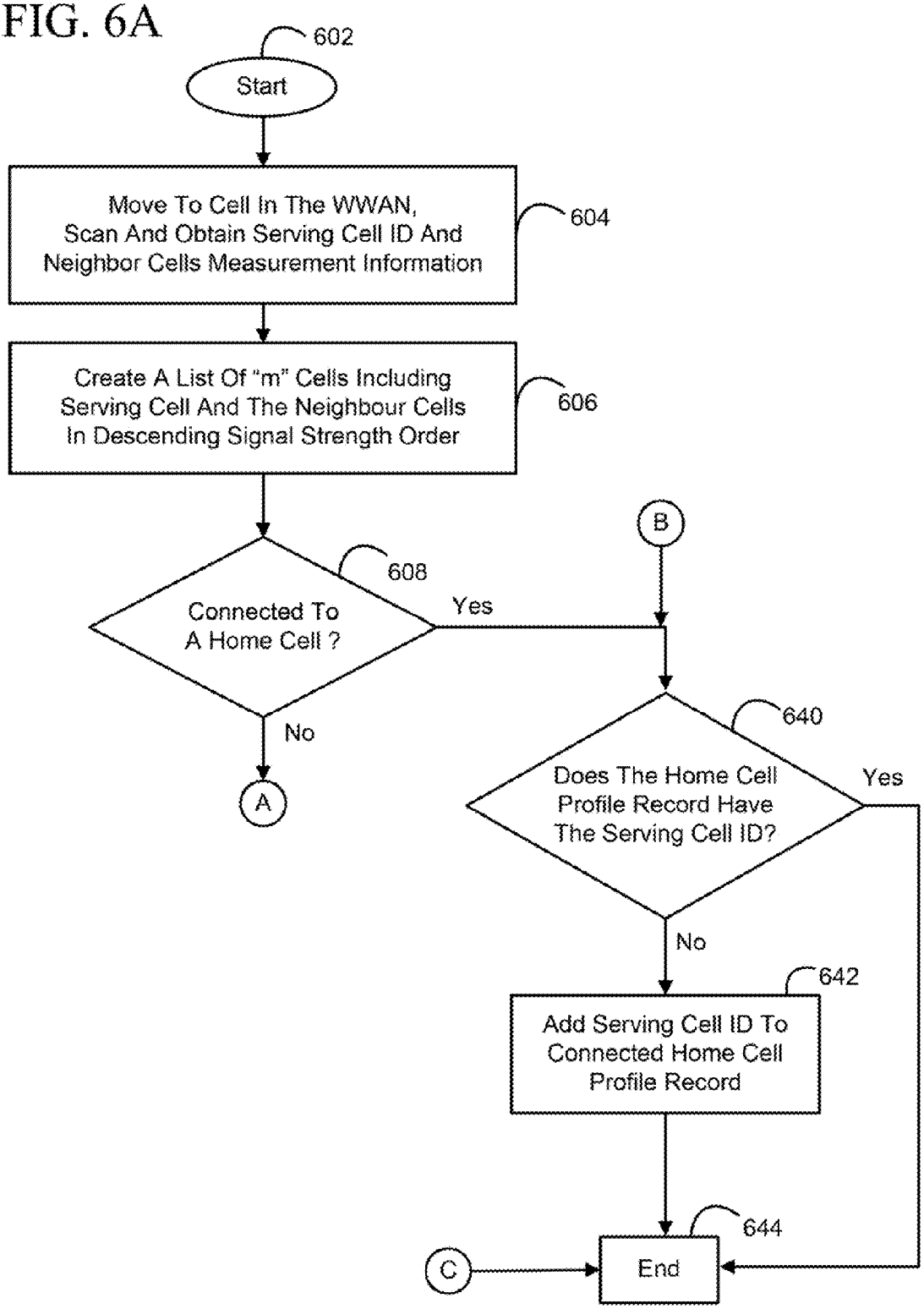

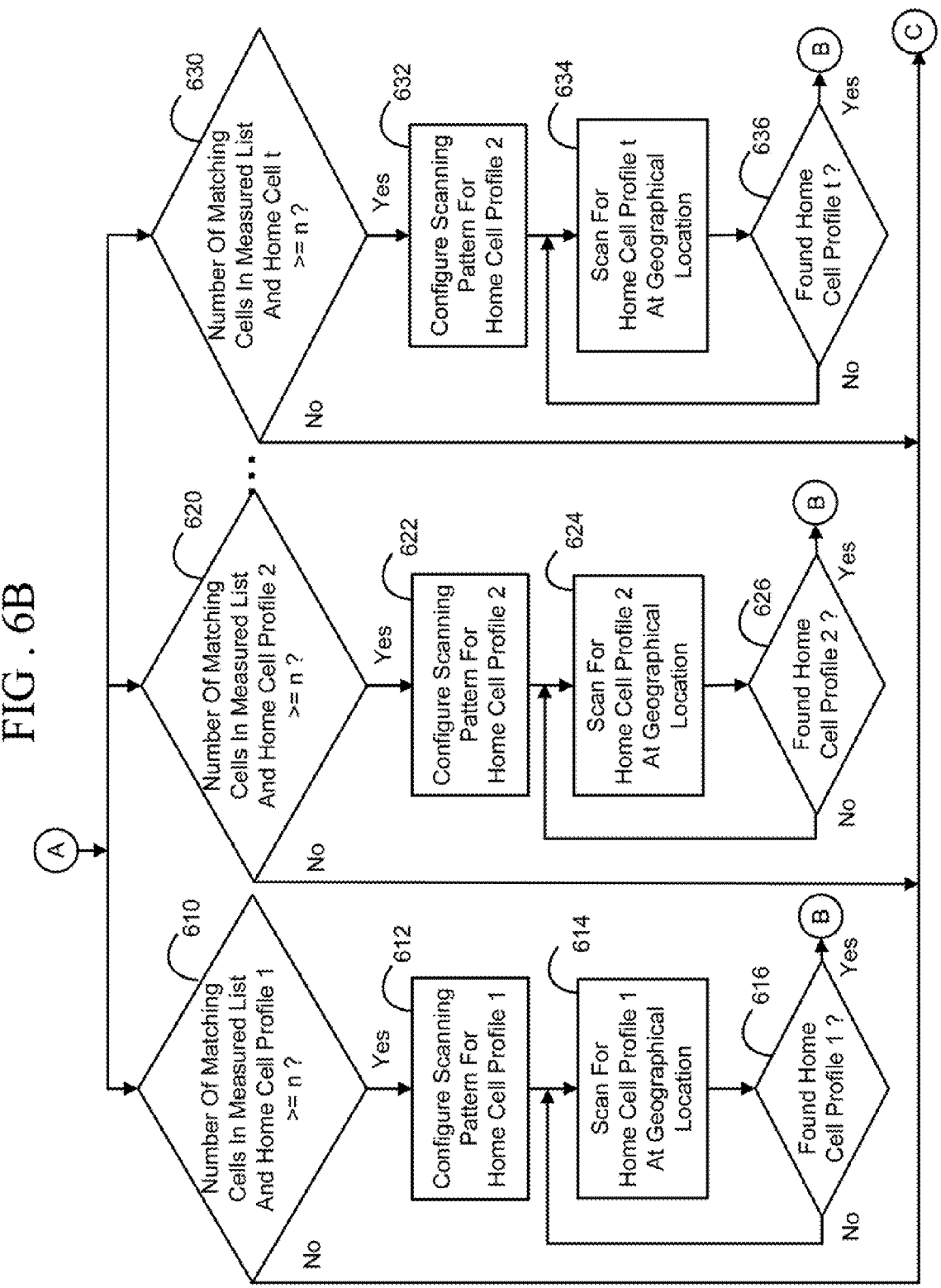

| (2G) | ARFCN | RSSI | C1 | C2 | Cell ID | BSIC | LAC | RAC |
|---|---|---|---|---|---|---|---|---|
| SE | 140 | -86 | 22 | 26 | 34093 | 12 | 14100 | 1 |
| E | 137 | -80 | 28 | 27 | 33992 | 14 | 14100 | 1 |
| E | 134 | -82 | 26 | 25 | 33993 | 50 | 14100 | 1 |
| E | 143 | -89 | 19 | 18 | 23533 | 14 | 14100 | 1 |
| E | 128 | -91 | 17 | 16 | 34092 | 12 | 14100 | 1 |

Kitchen Area 802

FIG. 10

| (2G) | ARFCN | RSSI | C1 | C2 | Cell ID | BSIC | LAC | RAC |
|---|---|---|---|---|---|---|---|---|
| SE | 137 | -76 | 32 | 36 | 33992 | 14 | 14100 | 1 |
| E | 143 | -79 | 29 | 33 | 23533 | 14 | 14100 | 1 |
| E | 134 | -82 | 26 | 30 | 33993 | 50 | 14100 | 1 |
| E | 139 | -91 | 17 | 23 | 673 | 49 | 14100 | 1 |
| G | 140 | -87 | 21 | 19 | 33972 | 01 | 14100 | 1 |

Bedroom Area 804

FIG. 11

| (2G) | ARFCN | RSSI | C1 | C2 | Cell ID | BSIC | LAC | RAC |
|---|---|---|---|---|---|---|---|---|
| SE | 134 | -74 | 34 | 38 | 33993 | 50 | 14100 | 1 |
| E | 136 | -79 | 29 | 33 | 34103 | 04 | 14100 | 1 |
| E | 143 | -83 | 25 | 29 | 23533 | 14 | 14100 | 1 |
| E | 132 | -83 | 25 | 29 | 23662 | 36 | 14100 | 1 |
| E | 138 | -84 | 24 | 28 | 36792 | 05 | 14100 | 1 |

Living Area 806

FIG. 12

| (2G) | ARFCN | RSSI | C1 | C2 | Cell ID | BSIC | LAC | RAC |
|---|---|---|---|---|---|---|---|---|
| SE | 143 | -79 | 29 | 33 | 23533 | 14 | 14100 | 1 |
| E | 140 | -83 | 25 | 29 | 34093 | 12 | 14100 | 1 |
| E | 136 | -84 | 24 | 28 | 34103 | 04 | 14100 | 1 |
| E | 137 | -86 | 22 | 26 | 33992 | 14 | 14100 | 1 |
| E | 134 | -89 | 19 | 23 | 33993 | 50 | 14100 | 1 |

Master Bedroom Area 808

FIG. 13

| (2G) | ARFCN | RSSI | C1 | C2 | Cell ID | BSIC | LAC | RAC |
|---|---|---|---|---|---|---|---|---|
| SE | 143 | -76 | 32 | 36 | 23533 | 14 | 14100 | 1 |
| E | 128 | -80 | 28 | 32 | 23572 | 08 | 14100 | 1 |
| E | 137 | -83 | 25 | 29 | 33992 | 14 | 14100 | 1 |
| E | 140 | -84 | 24 | 28 | 34093 | 12 | 14100 | 1 |
| E | 130 | -85 | 23 | 27 | 33982 | 13 | 14100 | 1 |

Location 704
Outside Of Residence 850

FIG. 14

| (2G) | ARFCN | RSSI | C1 | C2 | Cell ID | BSIC | LAC | RAC |
|---|---|---|---|---|---|---|---|---|
| SE | 128 | -96 | 12 | 16 | 23572 | 08 | 14100 | 1 |
| E | 143 | -95 | 13 | 17 | 23533 | 14 | 14100 | 1 |
| E | 131 | -102 | 6 | 10 | 23591 | 09 | 14100 | 1 |
| E | 138 | -103 | 5 | 9 | 23831 | 61 | 14100 | 1 |
| E | 139 | -106 | 2 | 6 | 23571 | 08 | 14100 | 1 |

Location 706
Outside Of Residence 850

US 8,254,985 B2

METHODS AND APPARATUS FOR USE IN CONTROLLING WIRELESS TRANSCEIVER OPERATION IN A MOBILE COMMUNICATION DEVICE

BACKGROUND

1. Field of the Technology

The present disclosure relates generally to mobile communication devices adapted to operate for communications in two or more different types of wireless communication networks, such as wireless wide area networks (WWANs) and wireless local area networks (WLANs) (e.g. operative in accordance with IEEE 802.11), and more particularly to techniques for controlling the operation of wireless transceivers for communications in these networks, and/or permitting the switching of communications between such networks.

2. Description of the Related Art

When a mobile communication device is adapted to communicate through more than one physical radio domain, the mobile device may select one of the domains through which to communicate. This is true for mobile devices that support operability in both wireless local area networks (WLANs) and wireless wide area networks (WWANs). The WLANs may operate in accordance with IEEE 802.11 standards, and the WWANs may be cellular telecommunication networks (e.g. operating in accordance with Global System for Mobile communications "GSM"/General Packet Radio Service "GPRS", Universal Mobile Telecommunication Systems "UMTS", etc.):

Cell selection rules in specification documents typically govern cell selection techniques for a mobile device. See, for example, $3^{rd}$ Generation Partnership Project (3GPP) Technical Specification (TS) 45.008, "3rd Generation Partnership Project; Technical Specification Group GSM/EDGE Radio Access Network; Radio subsystem link control"; specifically clause 6.4 "Criteria for cell selection and reselection" and 6.6.2 "Path loss criteria and timings for cell reselection"; for UMTS devices, see e.g. TS 25.304, clause 5.2.

The cell selection technique for GSM specifies a number of monitored parameters, including a minimum RSSI required to access a candidate cell and a minimum amount of time the candidate cell should be the strongest in the list of monitored cells. Per the specification, a candidate cell may be selected by the mobile device for two different reasons: (1) the path loss criterion (C1) falls below zero for five (5) seconds (i.e. essentially no signal exists at the receiver), or (2) the calculated value of radio signal strength indicator (RSSI) criterion (C2) is greater than the C2 of serving cell for more than five (5) seconds.

If the mobile device is adapted to operate with multiple radio access technologies (RAT), the mobile device may operate to autonomously select between WLAN cells and WWAN cells. If cell selection rules similar to that outlined in the 3GPP specification were utilized for such cell selection, the mobile device might select the WLAN cell if (1) its RSSI exceeds a certain threshold level and (2) the RSSI of the candidate cell is stronger than the current serving cell for greater than some length of time (e.g. five or ten seconds). However, the WLAN transceiver of the mobile device would need to be operated or enabled often or continuously during operation with the WWAN, which would consume excessive battery power of the mobile device.

What are needed are improved methods and apparatus for controlling wireless transceiver operations for a mobile device which has multiple transceivers.

BRIEF DESCRIPTION OF THE DRAWINGS

Embodiments of the present disclosure will now be described, by way of example only, with reference to the attached figures. Same reference numerals are used in different figures to denote similar elements.

FIG. 3A is a flowchart which describes a first method for controlling transceiver operation of the mobile device, for the switching of communication operations between WWANs and the WLANs;

FIGS. 5, 6A, and 6B are flowcharts for describing a more detailed method related to the technique of FIG. 3A for controlling transceiver operation of the mobile device;

FIGS. 9-14 is cell information of the mobile device from WWAN scanning operations while traversing the geographic region and residence of FIGS. 7-8.

DETAILED DESCRIPTION OF THE PREFERRED EMBODIMENTS

Figure 1:
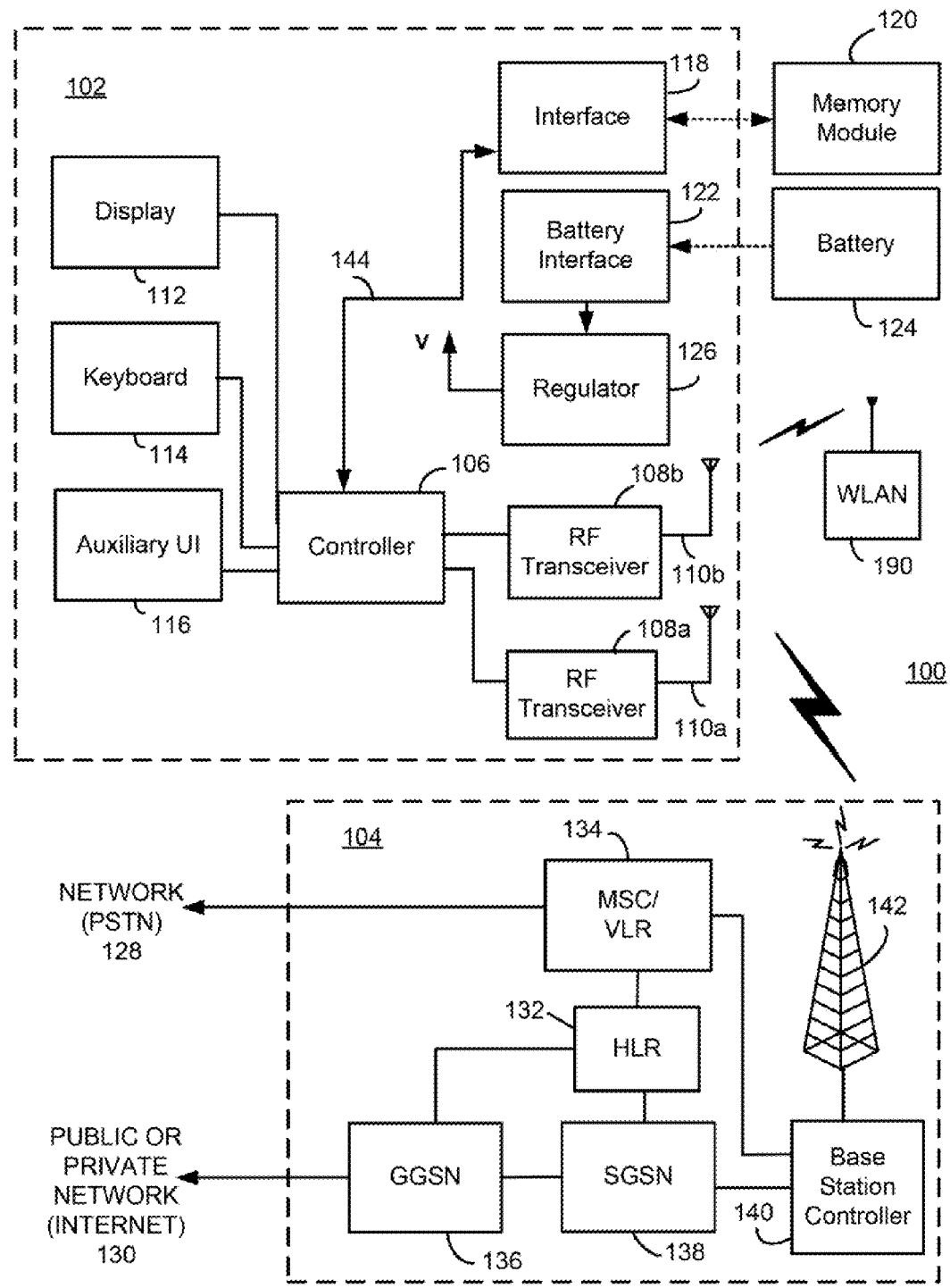
FIG. 1 is a schematic block diagram illustrating the basic components of a mobile communication device operating in a wireless communication system which includes a wireless wide area network (WWAN) (e.g. a GSM/GPRS wireless network) and a wireless local area network (WLAN)

Methods and apparatus for use in controlling wireless transceiver operation in a mobile communication device which is adapted to operate for communications in a wireless wide area network (WWAN) and a wireless local area network (WLAN) are described herein. In one illustrative embodiment, the mobile device operates for communications via the WLAN with use of a WLAN transceiver portion. During such operation, the mobile device performs one or more scanning operations with use of a WWAN transceiver portion for identifying a set of cell site identifications corresponding to a plurality of base stations of one or more WWANs available in a coverage region of the WLAN. The set of cell site identifications is stored in association with a WLAN profile of the WLAN. Subsequently, while the mobile device operates for communications in a WWAN, the WLAN transceiver portion may be maintained in a low power state. During the WWAN operation, the mobile device performs one or more scanning operations with use of the WWAN transceiver portion for identifying a current set of cell site identifications corresponding to the currently-serving base station of the WWAN and one or more neighboring base stations. The mobile device compares cell site identifications of the current set with cell site identifications of the stored set, and identifies if the number or percentage of matching cell site identifications of the current and stored sets meets or exceeds a predetermined threshold. If the predetermined threshold is met or exceeded, the mobile device enables operation of the WLAN transceiver portion for communications via the WLAN; otherwise, the mobile device refrains from enabling operation of the WLAN transceiver portion for communications via the WLAN. This technique may be performed in association with each WLAN profile stored in the mobile device.

In another illustrative embodiment, the mobile device performs one or more scanning operations with use of the WLAN transceiver portion in a geographical region, but fails to connect with any WLANs in the geographical region. The mobile device also performs one or more scanning operations with use of the WWAN transceiver portion for identifying a set of cell site identifications corresponding to a plurality of base stations of one or more WWANs available at its current location. The set of cell site identifications is stored in association with an indication of the failure to connect with any WLANs in the geographic region. Subsequently, while operating for communications via a WWAN with use of the WWAN transceiver portion, the WLAN transceiver portion may be maintained in a low power state. During the WWAN operation, the mobile device performs one or more scanning operations with use of the WWAN transceiver portion for identifying a current set of cell site identifications. The current set of cell site identifications corresponds to the currently-serving base station of the WWAN and one or more neighboring base stations. The mobile device compares cell site identifications of the current set with cell site identifications of the stored set. If the mobile device identifies a predetermined condition where the number or percentage of matching cell site identifications of the current and stored sets meets or exceeds a predetermined threshold, it refrains from enabling operation of its WLAN transceiver portion for communications via a WLAN. This technique may be performed in association with each one of a plurality of geographic regions (locations) through which the mobile device traverses.

Referring now to the drawings to illustrate one example of the system environment within which the techniques may be practiced, FIG. 1 is a schematic block diagram illustrating the basic components of a mobile communication device 102 which operates in a wireless communication system 100. In the example of FIG. 1, mobile device 102 is adapted to communicate with a wireless communication network 104 which is a cellular telecommunications network (one type of wireless wide area network or "WWAN"). Mobile device 102 is also adapted to communicate with a wireless local area network "WLAN" 190, which may be an IEEE 802.11-based wireless network.

For wireless communication with wireless network 104 (i.e. the WWAN), mobile device 102 utilizes radio frequency (RF) transceiver circuitry 108a and an antenna means 110a. For wireless communication with WLAN 190, mobile device 102 utilizes RF transceiver circuitry 108b for IEEE 802.11-based communications and an antenna means 110b. With such configuration, mobile device 102 may be referred to as a "dual mode" communication device. Although shown in FIG. 1 as having separate and independent transceiver components, at least some portions or components of these otherwise different transceivers may be shared.

Mobile device 102 may include a visual display 112, a keyboard 114, and perhaps one or more auxiliary user interfaces (UI) 116, each of which is coupled to a controller 106. Controller 106 is also coupled to RF transceiver circuitry 108a and antenna 110a, as well as RF transceiver circuitry 108b and antenna 110b. Typically, controller 106 is embodied as a central processing unit (CPU) which runs operating system software in a memory component (not shown). Controller 106 will normally control overall operation of mobile device 102, whereas signal-processing operations associated with communication functions are typically executed by the RF transceiver circuitry. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 also includes a battery interface 122 for receiving one or more rechargeable batteries 124. Battery 124 provides electrical power to electrical circuitry in mobile device 102, and battery interface 122 provides for a mechanical and electrical connection for battery 124. This provides wireless operation and portability of mobile device 102. Battery interface 122 is coupled to a regulator 126 which regulates power to the device.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile terminal block diagram of FIG. 1, the RF transceiver circuitry and antenna may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile device 102 may have a more particular implementation as described later in relation to mobile station 202 of FIG. 2.

Mobile device 102 sends communication signals to and receives communication signals over wireless communication links. For example, mobile device 102 may communicate with wireless network 104 via antenna 110a. RF transceiver circuitry 108a performs functions similar to those of a base station controller 140, including for example modulation/demodulation and possibly encoding/decoding and encryption/decryption. It is also contemplated that RF transceiver circuitry 108a may perform certain functions in addition to those performed by base station controller 140.

In the embodiment shown in FIG. 1, wireless network 104 technology is configured in accordance with Global Systems for Mobile communications (GSM) and General Packet Radio Service (GPRS) standards. Such network may further operate in accordance with Enhanced Data rates for GSM Evolution (EDGE) or Enhanced GPRS (EGPRS). Note, however, wireless network 104 may be based on any other suitable network technology, such as a Long-Term Evolution (LTE)-based network, an EVolution-Data Only (EV-DO)-based network, a UMTS-based network, or High Speed Packet Access (HSPA), as examples. It will be apparent to those skilled in art that the RF transceiver circuitry will be adapted to particular wireless network or networks in which mobile device 102 is intended to operate.

In the example embodiment of FIG. 1, wireless network 104 includes a base station controller (BSC) 140 with a base station 142, a Mobile Switching Center (MSC) 134, a Home Location Register (HLR) 132, a Serving GPRS Support Node (SGSN) 138, and a Gateway GPRS Support Node (GGSN) 136. MSC 134 is coupled to BSC 140 and to a landline network 128, such as a Public Switched Telephone Network (PSTN). SGSN 138 is coupled to BSC 140 and to GGSN 136, which is in turn coupled to a public or private data network 130 (such as the Internet). HLR 132 is coupled to MSC 134, SGSN 138, and GGSN 136. Mobile device 102 also operates using a memory module 120, such as a Subscriber Identity Module (SIM) (or e.g. a Universal SIM or U-SIM, or a Removable User Identity Module or R-UIM), which is connected to or inserted in mobile device 102 at an interface 118.

Base station 142 may be a fixed transceiver station, and BSC 140 and base to station 142 may together be referred to as fixed transceiver equipment. The fixed transceiver equipment provides wireless network coverage for a particular coverage area commonly referred to as a "cell". The transceiver equipment transmits communication signals to and receives communication signals from mobile terminals within its cell via base station 142. The transceiver equipment normally performs such functions as modulation and possibly encoding and/or encryption of signals to be transmitted to the mobile terminal in accordance with particular, usually predetermined, communication protocols and parameters, under control of its controller. The transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

Again, WLAN 190 may be an IEEE 802.11-based wireless network which provides communications for mobile device 102 in accordance with IEEE 802.11 standards. Although the present embodiment relates to a WLAN of the IEEE 802.11 type and a WWAN of the cellular network type, any suitable wireless network technologies may be utilized, such as WiMAX technologies (e.g. IEEE 802.16e-based technologies). For example, the WLAN may be an IEEE 802.11-based network and the WWAN may be an IEEE 802.16e-based network. As another example, the WLAN may be an IEEE 802.16e-based network and the WWAN may be the cellular network.

Figure 2:
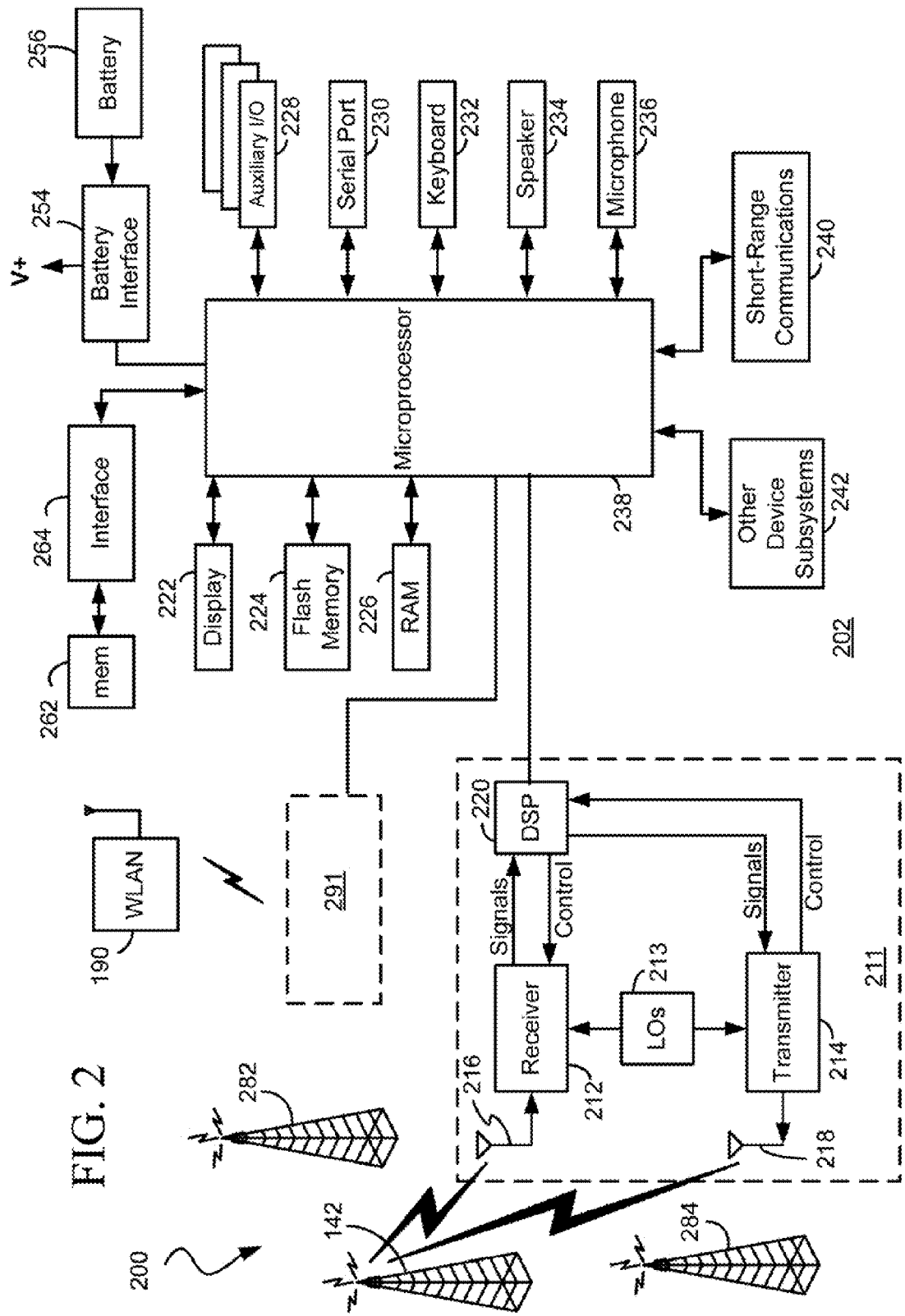
FIG. 2 is a schematic diagram of a particular mobile communication device of FIG. 1, namely a mobile station.

Referring now to FIG. 2, electrical components of one preferred mobile device 202 (e.g. a mobile station or terminal) will be described. Mobile device 202 is adapted to operate in connection with different communications systems which may be referred to as WLAN and WWAN). Mobile device 202 may be a two-way mobile communication device having at least voice and advanced data communication capabilities, which may include the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). As mobile device 202 is a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

As described, mobile device 202 is adapted to wirelessly communicate with WLANs, such as WLAN 190. In addition, mobile device 202 may be adapted to wirelessly communicate with cellular base station transceiver systems 200 of various WWANs, including systems 142, 282, and 284. For communication with cellular networks, mobile device 202 utilizes communication subsystem 211. For communication with WLANs, mobile device 202 utilizes an additional communication subsystem 291 which may have similar structural components as communication subsystem 211. With such configuration, mobile device 202 may be referred to as a "dual mode" mobile station. Although shown in FIG. 2 as having separate and independent subsystems, at least some portions or components of these otherwise different subsystems may be shared.

For communications with the WWAN, communication subsystem 211 includes a receiver 212, a transmitter 214, and associated components, such as one or more antenna elements 216 and 218 (e.g. embedded or internal), local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in the art, particular design of communication subsystem 211 depends on the communication network in which mobile device 202 is intended to operate.

Network access is associated with a subscriber or user of mobile device 202, and therefore mobile device 202 requires a memory module 262, such as a Subscriber Identity Module or "SIM" card, a Universal SIM (U-SIM), or a Removable User Identity Module (R-UIM), to be inserted in or connected to an interface 264 of mobile device 202 in order to operate in the network. After network procedures have been completed, mobile device 202 may send and receive communication signals through the network. Signals received by antenna 216 through the network are input to receiver 212, which may perform such common receiver functions as signal amplification, frequency down conversion, filtering, channel selection, and the like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

For communications with WLAN 190, communication subsystem 291 may include modules and processes which operate in accordance with IEEE 802.11 for communications. Communication subsystem 291 may be or include what is referred to as a WLAN driver, with which microprocessor 238 may communicate and control. Communication subsystem 291 may have similar structural components as communication subsystem 211, such as a receiver, a transmitter, and associated components, such as one or more (e.g. embedded or internal) antenna elements, local oscillators (LOs), and a processing module such as a baseband (BB) and media access control (MAC) processing module. As will be apparent to those skilled in the field of communications, the particular design of communication subsystem 291 depends on the communication network in which mobile device 202 is intended to operate. Again, in the present disclosure, communication subsystem 291 (including its associated processor/processing components) are operative in accordance with IEEE 802.11 standards.

Mobile device 202 may send and receive communication signals through WLAN 190 after required network procedures have been completed. Signals received by its antenna means via the network are input to the receiver, which may perform such common receiver functions as signal amplification, frequency down conversion, filtering, channel selection, and like, including A/D conversion. A/D conversion of a received signal allows more complex communication functions such as demodulation and decoding to be performed in the BB/MAC processing module of communication subsystem 291. In a similar manner, signals to be transmitted are processed, including modulation and encoding, for example, by the BB/MAC processing module. These processed signals are input to the transmitter for D/A conversion, frequency up conversion, filtering, amplification and transmission through the network via the antenna means. The BB/MAC processing module not only processes communication signals, but may also provide for receiver and transmitter control. Note that the receiver and transmitter may share one or more antennas through an antenna switch, instead of having two separate dedicated antennas.

Mobile device 202 includes a microprocessor 238 that controls overall operation of mobile device 202. This control includes the processing techniques of the present disclosure, which may also utilize the BB/MAC processing module of communication subsystem 291 and/or DSP 220 if and as needed. Communication functions, including at least data and voice communications, are performed by communication subsystem 211 and subsystem 291 as described above. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. As apparent, some of these subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, may enable execution of software applications on mobile device 202. A predetermined set of applications that control basic device operations, including at least data and voice communication applications, will normally be installed on mobile device 202 during its manufacture. One application that may be loaded onto mobile device 202 may be a personal information manager (PIM) application having the ability to organize and manage data items relating to the user such as, but not limited to, e-mail, calendar events, voice mails, appointments, and task items. Naturally, one or more memory stores are available on mobile device 202 and SIM 256 to facilitate storage of PIM data items and other information.

The PIM application may have the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 may be a complete alphanumeric keyboard and/or telephone-type keypad. These composed items may be transmitted over a communication network through communication subsystem 211 or 291. For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Again, although FIGS. 1-2 focus on the use of two specific types of networks (namely a cellular network as the WWAN and an IEEE 802.11 network as the WLAN), any two suitable networks may be utilized, where one of the networks has overlapping coverage with or is contained within the other network (e.g. WiMAX or IEEE 802.16, Home Node-B cells of a 3G macro Radio Access Network (RAN), or BLUE-TOOTH™, etc.).

FIG. 3A is a flowchart for describing a technique for use by a mobile communication device in controlling operation of its transceivers for the selection of wireless networks. The mobile communication device may be that which has been shown and described earlier in relation to FIG. 1 or 2, making use of one or more controllers or processors (e.g. microprocessor) to perform the techniques. The mobile device has a WWAN transceiver portion (e.g. RF transceiver circuitry 108a of FIG. 1, or communication subsystem 211 of FIG. 2) and a WLAN transceiver portion (e.g. RF transceiver circuitry 108b of FIG. 1, or communication subsystem 291 of FIG. 2) for operation. The technique may be embodied as a computer program product which includes a computer readable medium (e.g. memory of computer disk) and computer instructions stored in the computer readable medium. The computer instructions are executable by the one or more controllers or processors and adapted in accordance with the described steps or logic.

The mobile device has one or more WLAN profiles stored in its memory. Each WLAN profile has WLAN information contained therein. The WLAN information may include an identification which identifies the WLAN (e.g. a SSID or ESSID) and authentication information for obtaining access to the WLAN (e.g. a network key, passkey, security key, etc.). When operating in a WLAN, the mobile device normally operates for communications in one or more WLANs corresponding to its one or more stored WLAN profiles. On the other hand, the mobile device normally refrains from operating for communications with WLANs other than those WLANs having stored WLAN profiles. However, a user of the mobile device may manually instruct, via the user interface, the mobile device to operate with these other WLANs, where a new WLAN profile for the WLAN may be created and stored in the memory.

Beginning at a start block 302 of FIG. 3A, the mobile device operates for communications via a WLAN with use of the WLAN transceiver portion (step 304 of FIG. 3A). The connection between the mobile device and the WLAN is established via a wireless access point (AP) of the WLAN with use of the WLAN identification and authentication information contained in the WLAN profile. While operating in the WLAN, the mobile device receives services made available in the WLAN. The services may be or include a voice telephony service (e.g. VoIP) and/or a data communication service (e.g. Web browsing service, data synchronization service, e-mail message delivery service, etc., facilitated via a packet data communication service).

During this time, the mobile device may maintain its WWAN transceiver portion in a low power state. The low power state may be characterized by powering off the WWAN transceiver portion, in whole or in part. In another embodiment, the WWAN transceiver portion is maintained in its normal powered state (i.e. not the low power state) and operating during this time. In yet another embodiment, the mobile device receives partial services via the WWAN (e.g. voice call service, without packet data service) and partial services from the WLAN (e.g. packet data services).

In any event, while operating in the WLAN, the mobile device may perform operations with use of its WWAN transceiver portion either regularly (e.g. periodically, with use of a periodic timer-based trigger) or in response to detecting a predetermined condition (e.g. detecting a change in location, or an increase in mobility, etc.). The WWAN operations at this time include scanning operations with use of the WWAN transceiver portion (step 306 of FIG. 3A). In the scanning operation, the mobile device receives, via its WWAN transceiver portion, a set of cell site identifications corresponding to a plurality of base stations of one or more WWANs available at its current location. These cell site identifications may be or be referred to as cell IDs. As apparent, the current location of the mobile device is a location at which the WLAN is also available. The mobile device then stores, in its memory, the set of cell site identifications in association with the WLAN profile of the WLAN (step 308 of FIG. 3A). The mobile device may then place the WWAN transceiver portion into the low power state, if desired.

Sometime later, the mobile device has no connection to the WLAN but operates for communications in a WWAN (step 310 of FIG. 3A). The mobile device has selected the particular WWAN from other WWANs based on network selection techniques known in the art; the connection between the mobile device and the WWAN is established via a currently-serving base station of the WWAN. While operating in the WWAN, the mobile device receives services made available in the WWAN. The services may be or include a voice telephony service and/or a data communication service (e.g. Web browsing service, data synchronization service, e-mail message delivery service, etc., facilitated via a packet data communication service).

During this time, the mobile device may set and maintain its WLAN transceiver portion in a low power state (step 312 of FIG. 3A). The low power state of the WLAN transceiver portion may be characterized by powering off the WLAN transceiver portion, in whole or in part. On the other hand, the low power state may be characterized by the setting of a substantially reduced scan rate of the WLAN transceiver portion. In another embodiment, the WLAN transceiver portion is maintained in its normal powered state (i.e. not the low power state) and operating without the receipt of services. In any event, while operating in the WWAN, the mobile device performs the following operations to identify whether it should enable its WLAN transceiver portion for communications. In particular, the mobile device performs a scanning operation with use of the WWAN transceiver portion (step 314 of FIG. 3A). During the scanning operation, the mobile device receives a current set of cell site identifications via its WWAN transceiver portion. The current set of cell site identifications are received from and correspond to the currently-serving base station and one or more neighboring base stations of the mobile device.

The mobile device then compares cell site identifications of the current set with cell site identifications of the previously-stored set associated with the WLAN profile (step 316 of FIG. 3A). The mobile device identifies, based on this comparison, whether the number or percentage of matching cell site identifications of the current and stored sets meets or exceeds a predetermined threshold (step 318 of FIG. 3A). In response to identifying that the predetermined threshold is exceeded, the mobile device causes the WLAN transceiver portion to exit the low power state and enables operation of the WLAN transceiver portion for communications via the WLAN (step 320 of FIG. 3A). Otherwise, if the predetermined threshold is not exceeded, the mobile device may maintain the WLAN transceiver portion in the low power state, and/or refrain from enabling operation of the WLAN transceiver portion for communications via the WLAN.

In step 320 of FIG. 3A, the mobile device performs a scanning operation using the WLAN transceiver portion for identifying whether the WLAN associated with the WLAN profile is available. If the WLAN is available, a connection may be established between the mobile device and the WLAN via a wireless access point (AP) of the WLAN (step 322 of FIG. 3A). The connection may be established with use of the WLAN identification and authentication information contained in the WLAN profile. If yes in step 322, steps of the flowchart are repeated starting at step 304, where the mobile device again operates with and receives the services made available in the WLAN. Steps 306 and 308 may also be performed again, where the set of cell site identifications associated with the WLAN profile are updated, for adding any additionally received cell site identifications that are not already included in the stored set of cell site identifications associated with the WLAN profile.

If no connection is established with the WLAN (e.g. the WLAN is unavailable, or there is a communication error) in step 322, however, the mobile device continues to operate and receive the (e.g. full) services in the WWAN. Steps of the flowchart are repeated starting at step 310, where the WLAN transceiver portion is placed back in the low power state in step 312.

Note that steps 304-308 of FIG. 3A may be performed for each WLAN with which the mobile device connects and maintains a WLAN profile. Relatedly, steps 316 and 318 of FIG. 3A may be performed with respect to each stored WLAN profile in the mobile device. Here, the mobile device compares the current set of cell site identifications with each different stored set of cell site identifications associated with each different WLAN profile. If any one of the comparisons results in meeting or exceeding the predetermined threshold, the mobile device causes the WLAN transceiver portion to exit the low power state for scanning in step 320.

In one embodiment, the storing of the set of cell site identifications associated with the WLAN profile in steps 306 and 308 is performed only a single time when (e.g. initially) connected with the corresponding WLAN. In another embodiment, the mobile device regularly updates the stored set of cell site identifications during operation. In that case, steps 306 and 308 are repeated for the same WLAN, for adding any additionally-received cell site identifications that do not already exist in the stored set associated with the WLAN profile. Such a technique is useful especially in the case where the coverage region of the WLAN is relatively large and overlaps with several different cells of one or more WWANs (which may be the case when the WLAN has a plurality of wireless APs).

Figure 3B:
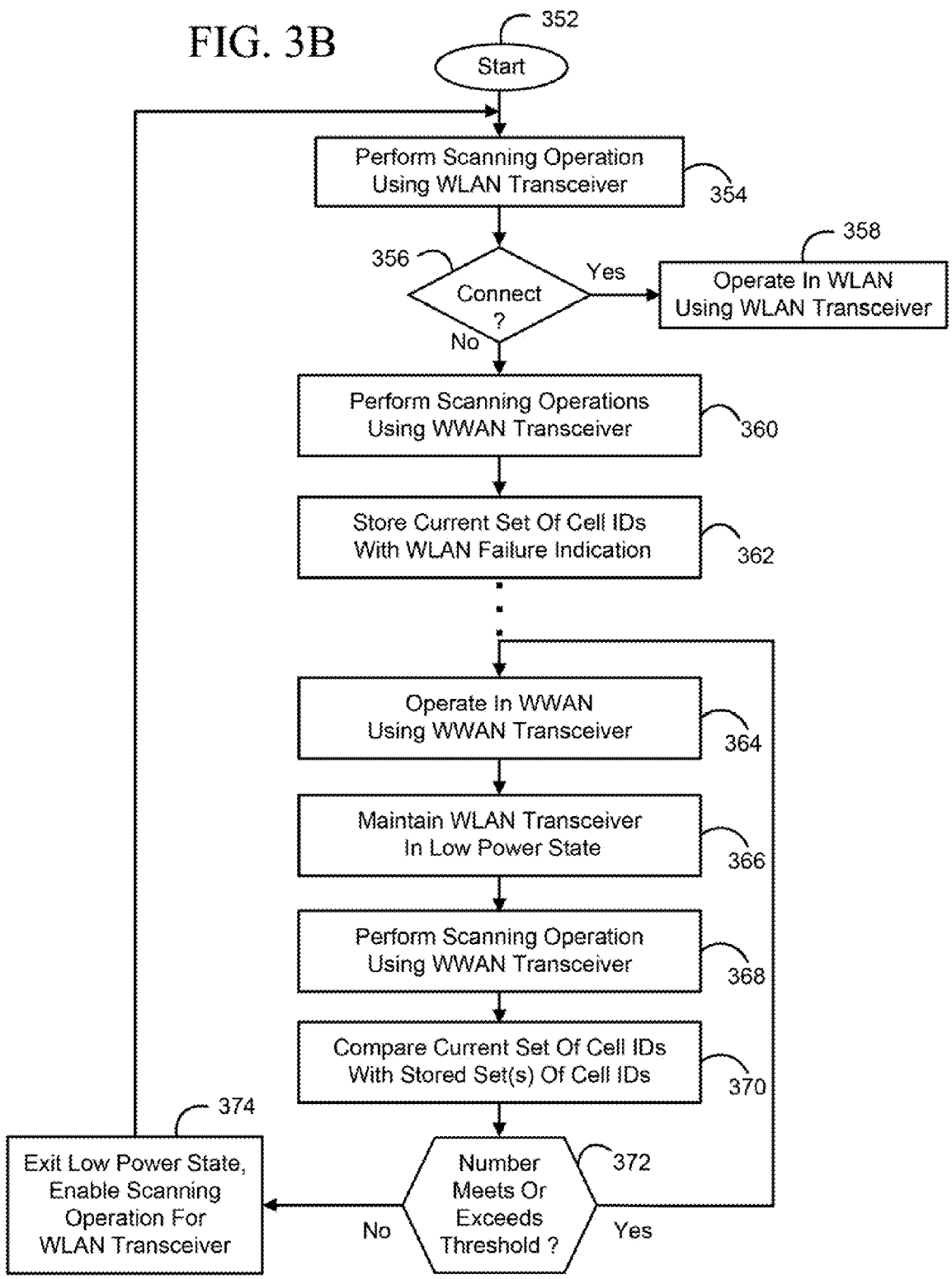
FIG. 3B is a flowchart which describes a second method for controlling transceiver operation of the mobile device, for the switching of communication operations between WWANs and the WLANs.

FIG. 3B is a flowchart for describing an alternative technique for use by a mobile communication device in controlling operation of its transceivers for the selection of wireless networks. The mobile communication device may be that which has been shown and described earlier in relation to FIG. 1 or 2, making use of one or more controllers or processors (e.g. microprocessor) to perform the techniques. The technique may be embodied as a computer program product which includes a computer readable medium (e.g. memory of computer disk) and computer instructions stored in the computer readable medium. The computer instructions are executable by the one or more controllers or processors and adapted in accordance with the described steps or logic.

As described earlier above, the mobile device has one or more WLAN profiles stored in its memory. Each WLAN profile has WLAN information contained therein. The WLAN information may include an identification which identifies the WLAN (e.g. a SSID or ESSID) and authentication information for obtaining access to the WLAN (e.g. a network key, passkey, security key, etc.). The mobile device normally operates for communications in one or more WLANs corresponding to the one or more stored WLAN profiles. On the other hand, the mobile device normally refrains from operating for communications with WLANs other than those WLANs having stored WLAN profiles. However, a user of the mobile device may manually instruct, via the user interface, the mobile device to operate with these other WLANs, where a new WLAN profile for the WLAN may be created and stored in the memory.

Beginning at a start block 302 of FIG. 3B, the mobile device performs one or more scanning operations using the WIAN transceiver portion (step 354 of FIG. 3B). The mobile device performs the scanning operations in order to identify whether any WLAN associated with any one of its stored WLAN profiles is available. The scanning operations may be active or passive scanning operations. If one of the WLANs is available, a connection between the mobile device and the WLAN may be established via a wireless AP of the WLAN. The scanning operation and the establishment of the connection are performed with use of the WLAN identification and authentication information contained in the WLAN profile.

If the connection with the WLAN is established in step 356, the mobile device operates for communications via the WLAN with use of the WLAN transceiver portion (step 358 of FIG. 3B). While operating in the WLAN, the mobile device receives services made available in the WLAN. The services may be or include a voice telephony service (e.g. VoIP) and/or a data communication service (e.g. Web browsing service, data synchronization service, e-mail message delivery service, etc., facilitated via a packet data communication service).

During this time, the mobile device may maintain its WWAN transceiver portion in a low power state. The low power state may be characterized by powering off the WWAN transceiver portion, in whole or in part. In another embodiment, the WWAN transceiver portion is maintained in its normal powered state (i.e. not the low power state) and operating during this time. In yet another embodiment, the mobile device receives partial services via the WWAN (e.g. voice call service, without packet data service) and partial services from the WLAN (e.g. packet data services) during this time.

If, in step 356, no connection is established with any WLAN corresponding to any one of the stored WLAN profiles, the mobile device will perform operations with use of its WWAN transceiver portion. These operations include the performing a scanning operation with use of the WWAN transceiver portion (step 360 of FIG. 3B). During the scanning operation, the mobile device receives, via its WWAN transceiver portion, a set of cell site identifications corresponding to a plurality of base stations of one or more WWANs available at its current location. These cell site identifications may be or be referred to as cell IDs. Here, the current location of the mobile device is a location at which no WLANs of the stored WLAN profiles are available. Note that private WLANs that are not accessible to the mobile device might exist at its location. The mobile device then stores, in its memory, the set of cell site identifications in association with a WLAN failure indication (step 362 of FIG. 3B), or in any other fashion to designate that the set corresponds to no WLAN connection. The set of cell site identifiers is also stored in association with a location identification, which distinguishes between the set and other stored sets of cell site identifiers.

Sometime later, the mobile device has no connection to the WLAN but operates for communications in a WWAN (step 364 of FIG. 3B). The mobile device has selected the particular WWAN from other WWANs based on network selection techniques known in the art; the connection between the mobile device and the WWAN is established via a currently-serving base station of the WWAN. While operating in the WWAN, the mobile device receives services made available in the WWAN. The services may be or include a voice telephony service and/or a data communication service (e.g. Web browsing service, data synchronization service, e-mail message delivery service, etc., facilitated via a packet data communication service).

During this time, the mobile device normally sets and maintains its WLAN transceiver portion in a low power state (step 366 of FIG. 3B). Again, the low power state of the WLAN transceiver portion may be characterized by powering off the WLAN transceiver portion, in whole or in part. On the other hand, the low power state may be characterized by the setting of a substantially reduced scan rate of the WLAN transceiver portion. In another embodiment, the WLAN transceiver portion is maintained in its normal powered state (i.e. not the low power state) and operating without the receipt of services.

In any event, while operating in the WWAN, the mobile device performs the following operations to identify whether it should enable its WLAN transceiver portion for communications. The mobile device performs these operations either regularly (e.g. periodically, with use of a periodic timer-based trigger) or in response to detecting a predetermined condition (e.g. detecting a change in location, or an increase in mobility, etc.). In particular, the mobile device performs a scanning operation with use of the WWAN transceiver portion (step 368 of FIG. 3B). During the scanning operation, the mobile device receives a current set of cell site identifications via its WWAN transceiver portion. The current set of cell site identifications are received from and correspond to the currently-serving base station and one or more neighboring base stations available at the current location of the mobile device. The mobile device then compares cell site identifications of the current set with cell site identifications of the stored set associated with the WLAN profile (step 370 of FIG. 3B). The mobile device identifies, based on this comparison, whether the number or percentage of matching cell site identifications of the current and stored sets meets or exceeds a predetermined threshold (step 372 of FIG. 3B).

In response to identifying that the predetermined threshold is not exceeded in step 372, the mobile device causes the WLAN transceiver portion to exit the low power state and enables operation of the WLAN transceiver portion for communications via the WLAN (step 374 of FIG. 3B). Otherwise, if the predetermined threshold is exceeded in step 372, the mobile device repeats the steps in the flowchart for operating in the WWAN (step 364) and maintaining the WLAN transceiver portion in the low power state (step 366), and/or refrain from enabling operation of the WLAN transceiver portion for communications via the WLAN.

In step 374 of FIG. 3B, repeating back to step 354, the mobile device performs a scanning operation using the WLAN transceiver portion for identifying whether any WLAN associated with any one of the stored WLAN profiles is available at its current location. If a WLAN is available, a connection may be established between the mobile device and the WLAN via a wireless AP of the WLAN. If a connection is established in step 356, the mobile device operates with and receives the services made available in the WLAN. If no connection is established in step 356, then the subsequent steps are performed again as previously described.

The set of cell site identifications associated with the WLAN profile may be updated in steps 360 and 362, for adding any additionally received cell site identifications that are not already included in the stored set of cell site identifications associated with the WLAN failure indication and location identifier. The mobile device continues to operate and receive services in the WWAN in step 364, where the WLAN transceiver portion may be placed back in the low power state in step 366.

In another embodiment, step 374 may alternatively merely provide an indication that WLAN scanning is permissible, but WLAN scanning will occur only if other conditions or indications are met as well. For example, step 374 may indicate that the enabling of the WLAN transceiver and the WLAN scanning is permissible, but the enabling and scanning will only occur if and when a timer-triggered WLAN scanning process also indicates that it is time for WLAN scanning to occur (e.g. timer expiration or interrupt). If such a technique is employed, even though the timer-triggered WLAN scanning process indicates that it is time for WLAN scanning to occur, the enabling and scanning may be restricted indefinitely if the mobile device remains in a coverage region where the predetermined threshold is regularly exceeded (i.e. "YES" in step 372). In yet another embodiment, a time-triggered WLAN scanning process is utilized by the mobile device, but step 374 serves to increase the scan rate (i.e. decrease the initial value of the timer when set) of the time-triggered WLAN scanning process from the current scan rate.

Note further that steps 360 and 362 of FIG. 3B may be performed for each different location for which no WLAN connection was made. Relatedly, steps 370 and 372 of FIG. 3B may be performed with respect to each different set of cell site identifications corresponding to each different location identifier. Here, the mobile device compares the current set of cell site identifications with each different stored set of cell site identifications associated with each different location identifier. If all of the comparisons result in a failure to meet or exceed the predetermined threshold, the mobile device causes the WLAN transceiver portion to exit the low power state for scanning in step 374.

In one embodiment, the storing of the set of cell site identifications associated with the location identifier in steps 360 and 362 is performed only a single time when (e.g. initially) there is no WLAN connection made. In another embodiment, the mobile device regularly updates the stored set of cell site identifications during operation. In that case, steps 360 and 362 are repeated for the same coverage region, for adding any additionally-received cell site identifications that do not already exist in the stored set associated with the location identifier.

Note that step 320 (FIG. 3A) or step 374 (FIG. 3B) may merely provide or indicate a permission or allowance to operate the WLAN transceiver portion. If mobile device 202 operates in an automatic network selection mode, for example, then it may automatically (i.e. without user intervention) switch operation for communications with the WLAN. If mobile device 202 operates in a manual network selection mode, then it may automatically (i.e. without user intervention) cause an indicator which indicates the availability of the WLAN to be visually display in its visual display and optionally provide an audible alert. This user interface mechanism is provided to alert the end user of mobile device 202 to decide whether or not to select (i.e. switch to) the newly-available and permitted WLAN. In response to an end-user actuation of an input switch of the user interface of mobile device 202, indicating a manual selection of the WLAN, mobile device 202 switches operation for communications to the WLAN. In an alternative approach, the indicator is provided for manual selection for a predetermined time period, however the mobile device 202 will automatically switch operation for communications with the WLAN unless the end user indicates a preference not to switch to it within the predetermined time period. When switching is performed (whether automatic or manual or other), mobile device 202 operates to switch use of its appropriate radio or RF transceiver portions corresponding to the appropriate wireless communication network.

Advantageously, since the WLAN transceiver portion need not be continuously enabled or activated, power consumption is reduced and battery life is increased with use of the described techniques. In one embodiment, mobile device 202 utilizes both techniques of FIGS. 3A and 3B in combination to further reduce power consumption.

Figure 4:
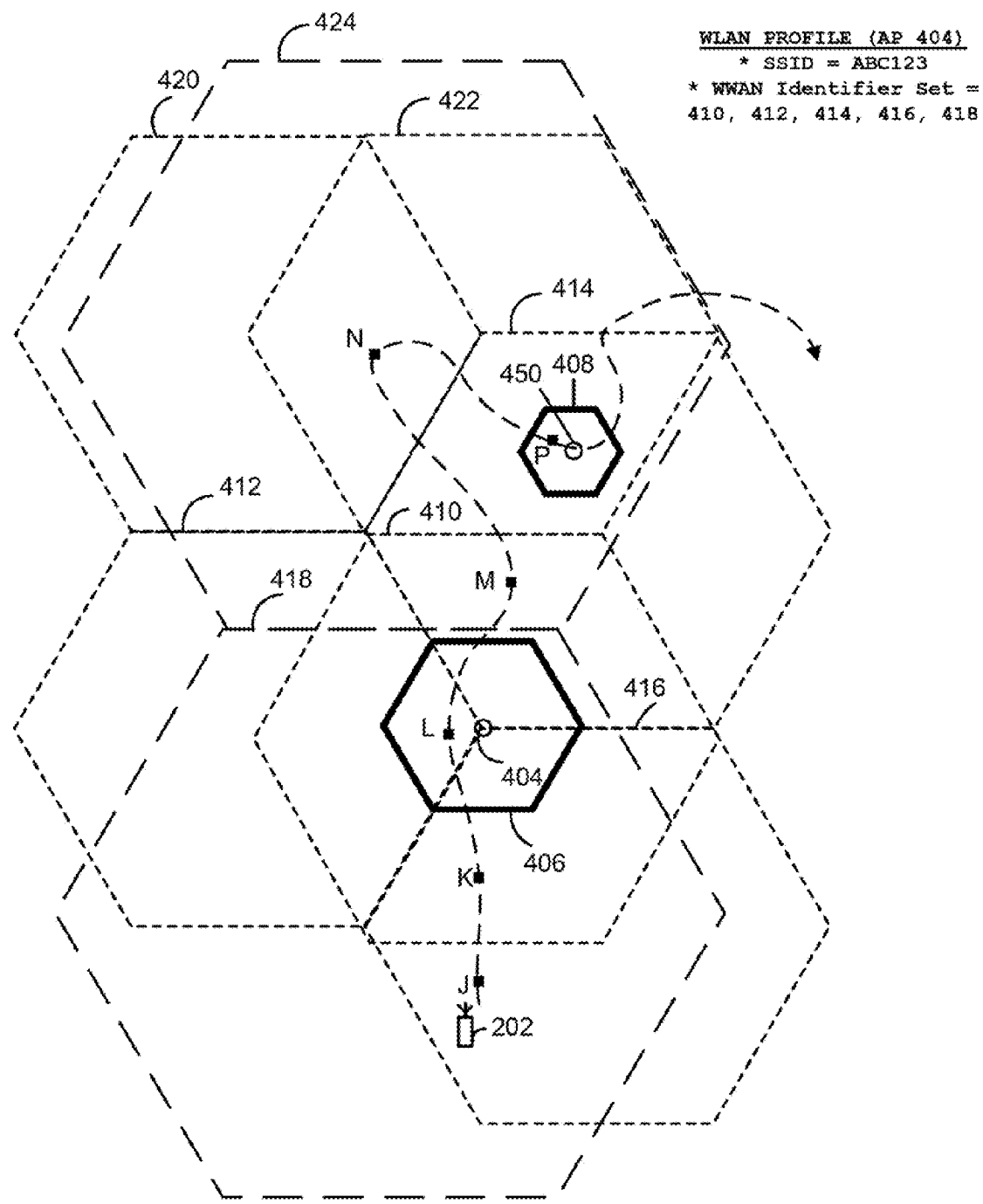
FIG. 4 is a top down view of an environment having the mobile device operating in the wireless communication system and travelling through cells of WWANs and WLANs, for better illustrating the techniques of FIGS. 3A and 3B.

To help further illustrate the techniques of the present disclosure, FIG. 4 is a top down view of a geographic region having one or more WWANs which provide a plurality of WWAN cells 412, 414, 418, 420, 422, and 424 of communication coverage, and one or more WLANs which provide a plurality of WLAN cells 406 and 408 of communication coverage. As shown in the top down view, many of the cells provide overlapping communication coverage where so depicted. This cell configuration shown has been provided for illustrative purposes, and will vary in practice as one skilled in the art will appreciate.

FIG. 4 will first be described to illustrate the technique associated with the flowchart of FIG. 3A. A first WLAN includes a wireless AP 404 which defines a coverage region or WLAN cell 406 and a second WLAN includes a wireless AP 450 which defines a coverage region or WLAN cell 408. The first WLAN having wireless AP 404 has an identification which is a set service identifier (SSID). In this example, the SSID of the first WLAN is "ABC123."

Mobile device 202 has a plurality of WLAN profiles stored in its memory, including a WLAN profile associated with the first WLAN having wireless AP 404. The stored WLAN profile for the first WLAN includes the SSID of "ABC123" and unique authentication information associated therewith. A set of WWAN cell identifications is also stored in association with this WLAN profile. In this example, the set of WWAN cell identifications includes WWAN cell identifications (e.g. cell IDs), which correspond to WWAN cells 410, 412, 414, 416, and 418. Mobile device 202 does not have any stored WLAN profile or information for the second WLAN having wireless AP 450.

In FIG. 4, mobile device 202 is shown to traverse a path through the various cells of communication coverage. Mobile device 202 is initially operating in a WWAN and has its WLAN transceiver portion in the low power state. When performing a WWAN scanning operation in a location J, mobile device 202 receives a current set of cell IDs corresponding to WWAN cells 416 and 418. The comparison between the current and stored sets of cell IDs results in a match of two cell IDs (WWAN cells 416 and 418) out of the five cell IDs (WWAN cells 410, 412, 414, 416, and 418), which is a 40% match. In this example, the predetermined threshold for WLAN operation is set at three (3) cell IDs or 60% (i.e. 3 out of 5). As 40% does not meet or exceed the predetermined threshold of 60%, the mobile device refrains from enabling its WLAN transceiver portion and maintains communications with the WWAN.

Subsequently, moving to a location K, mobile device 202 continues to operate in the WWAN with its WLAN transceiver portion in the low power state. When performing a WWAN scanning operation in the location K, mobile device 202 receives a current set of cell IDs corresponding to WWAN cells 410, 412, 416, and 418. The comparison between the current and stored sets of cell IDs results in a match of three cell IDs (WWAN cells 410, 416, and 418) out of the five cell IDs (WWAN cells 410, 412, 414, 416, and 418), which is a 60% match. As 60% meets the predetermined threshold of 60%, there is an increased probability that the WLAN will be found. In response, the mobile device enables its WLAN transceiver portion and performs a scanning operation with a selected scanning profile in attempt to identify the first WLAN corresponding to its stored WLAN profile. In this case, mobile device 202 is not located within the coverage region of wireless AP 404 of the first WLAN, and therefore is unable to connect. Mobile device 202 continues to operate in the WWAN, but may regularly perform scanning operations using its WLAN transceiver portion in attempt to identify the first WLAN.

Later, moving to a location L, mobile device 202 performs a WWAN scanning operation and receives a current set of cell IDs corresponding to WWAN cells 410, 412, and 418. The comparison between the current and stored sets of cell IDs again results in a match of three cell IDs (WWAN cells 410, 412, and 418) out of the five cell IDs (WWAN cells 410, 412, 414, 416, and 418), which is a 60% match. As 60% meets the predetermined threshold of 60%, the mobile device enables its WLAN transceiver portion and performs a scanning operation in attempt to identify the first WLAN corresponding to its stored WLAN profile. In this case, mobile device 202 is located within the coverage region of wireless AP 404 of the first WLAN, and therefore is able to connect in the WLAN. Thus, the mobile device 202 operates for communications in the first WLAN. In addition, the mobile device 202 may place its WWAN transceiver portion in the low power state if desired, or request and receive only partial services from the WWAN (e.g. the remaining services being obtaining via the first WLAN).

Subsequently, moving to a location M, mobile device 202 loses coverage with the first WLAN and switches operation to the WWAN in response. When performing a WWAN scanning operation in the location M, mobile device 202 receives a current set of cell IDs corresponding to WWAN cells 410, 414, and 424. The comparison between the current and stored sets of cell IDs results in a match of two cell IDs (WWAN cells 410 and 414) out of the five cell IDs (WWAN cells 410, 412, 414, 416, and 418), which is a 40% match. As 40% does not meet or exceed the predetermined threshold of 60%, the mobile device refrains from enabling its WLAN transceiver portion and maintains communications with the WWAN.

Moving to a location N, mobile device 202 receives a current set of cell IDs corresponding to WWAN cells 420, 422, and 424, resulting in a match of zero cell IDs or 0% match. Thus, mobile device 202 maintains the low power state of its WLAN transceiver portion. At a location P, mobile device 202 receives a current set of cell IDs corresponding to WWAN cells 414, 422 and 424, resulting in a 20% match of one cell ID (WWAN cell 414) out of the five cell IDs (WWAN cells 410, 412, 414, 416, and 418). Again, mobile device 202 maintains the low power state of its WLAN transceiver portion, despite mobile device 202 being within WWAN cell 408 of the second WLAN having wireless AP 450.

FIG. 4 will now be described to illustrate the technique associated with the flowchart of FIG. 3B. Mobile device 202 has a plurality of WLAN profiles stored in its memory, including the WLAN profile associated with the first WLAN having wireless AP 404. Mobile device 202 does not have any stored WLAN profile or information for the second WLAN having wireless AP 450. Having previously traversed this environment, mobile device 202 stores different sets of WWAN cell identifications (e.g. cell IDs) in association with different location identifiers, which correspond to WLAN failure regions. In this example, mobile device 202 stores a set of cell IDs corresponding to WWAN cells 420, 422, and 424 in association with a WLAN failure and a location identifier.

Mobile device 202 is operating in a WWAN and has its WLAN transceiver portion in the low power state. When performing a WWAN scanning operation in location J, mobile device 202 receives a current set of cell IDs corresponding to WWAN cells 416 and 418. The comparison between the current and stored sets of cell IDs results in a match of zero cell IDs (WWAN cells 416 and 418) out of the three cell IDs (WWAN cells 420, 422, and 424), which is a 0% match. In this example, the predetermined threshold for WLAN operation is set at two (2) cell IDs or 50% (i.e. 2 out of 4). As 0% is less than the predetermined threshold of 50%, there is an increased probability that a WLAN will be found. In response, the mobile device enables its WLAN transceiver portion and performs a scanning operation in attempt to identify the first WLAN corresponding to the stored WLAN profile. In this case, mobile device 202 is not located within the coverage region of wireless AP 404 of the first WLAN, and therefore is unable to connect. Thus, the mobile device 202 continues to operate in the WWAN, and may continue to perform scanning operations using its WLAN transceiver portion at this location.

Subsequently, moving to location K, mobile device 202 continues to operate in the WWAN with its WLAN transceiver portion in the low power state. When performing a WWAN scanning operation in the location K, mobile device 202 receives a current set of cell IDs corresponding to WWAN cells 410, 412, 416, and 418. The comparison between the current and stored sets of cell IDs results in a match of zero cell IDs (WWAN cells 410, 416, and 418) out of the three cell IDs (WWAN cells 420, 422, and 424), which is again a 0% match. As 0% is less than the predetermined threshold of 50%, the mobile device continues to perform scanning operations in attempt to identify the first WLAN corresponding to its stored WLAN profile. In this case, mobile device 202 is not located within the coverage region of wireless AP 404 of the first WLAN, and therefore is unable to connect. Thus, the mobile device 202 continues to operate in the WWAN, and may continue to perform scanning operations using its WLAN transceiver portion at this location.

Later, moving to location L, mobile device 202 performs a WWAN scanning operation and receives a current set of cell IDs corresponding to WWAN cells 410, 412, and 418. The comparison between the current and stored sets of cell IDs again results in a match of zero cell IDs (WWAN cells 410, 412, and 418) out of the three cell IDs (WWAN cells 420, 422, and 424), which is still a 0% match. As 0% still fails to meet or exceed the predetermined threshold of 50%, the mobile device enables its WLAN transceiver portion and performs a scanning operation in attempt to identify the first WLAN corresponding to its stored WLAN profile. In this case, mobile device 202 is located within the coverage region of wireless AP 404 of the first WLAN, and therefore is able to connect in the WLAN. Thus, the mobile device 202 operates for communications in the first WLAN. In addition, the mobile device 202 may place its WWAN transceiver portion in the low power state if desired, or request and receive only partial services from the WWAN (e.g. the remaining services being obtaining via the first WLAN).

Subsequently, moving to location M, mobile device 202 loses coverage with the first WLAN and switches operation to the WWAN in response. When performing a WWAN scanning operation in the location M, mobile device 202 receives a current set of cell IDs corresponding to WWAN cells 410, 414, and 424. The comparison between the current and stored sets of cell IDs results in a match of one cell ID (WWAN cell 424) out of the three cell IDs (WWAN cells 420, 422, and 424), which is a 33% match. As 33% still fails to meet or exceed the predetermined threshold of 50%, the mobile device enables its WLAN transceiver portion and performs a scanning operation in attempt to identify the first WLAN corresponding to its stored WLAN profile. In this case, mobile device 202 is not located within the coverage region of wireless AP 404 of the first WLAN, and therefore is unable to connect. Thus, the mobile device 202 continues to operate in the WWAN, and may continue to perform scanning operations using its WLAN transceiver portion in attempt to identify the first WLAN.

Moving to location N, mobile device 202 performs a WWAN scanning operation and receives a current set of cell IDs corresponding to WWAN cells 420, 422, and 424. The comparison between the current and stored sets of cell IDs results in a match of three cell IDs (WWAN cells 420, 422, and 424) out of the three cell IDs (WWAN cells 420, 422, and 424), which is a 100% match. As 100% exceeds the predetermined threshold of 50%, mobile device 202 sets and maintains its WLAN transceiver portion in the low power state, and maintains operation in the WWAN. At location P, mobile device 202 receives a current set of cell IDs corresponding to WWAN cells 414, 422 and 424, resulting in a 66% match of two cell IDs (WWAN cells 422 and 424) out of the three cell IDs (WWAN cells 420, 422, and 424). Again, mobile device 202 maintains the low power state of its WLAN transceiver portion, despite mobile device 202 being within WLAN cell 408 of the second WLAN having wireless AP 450.

Figure 5:
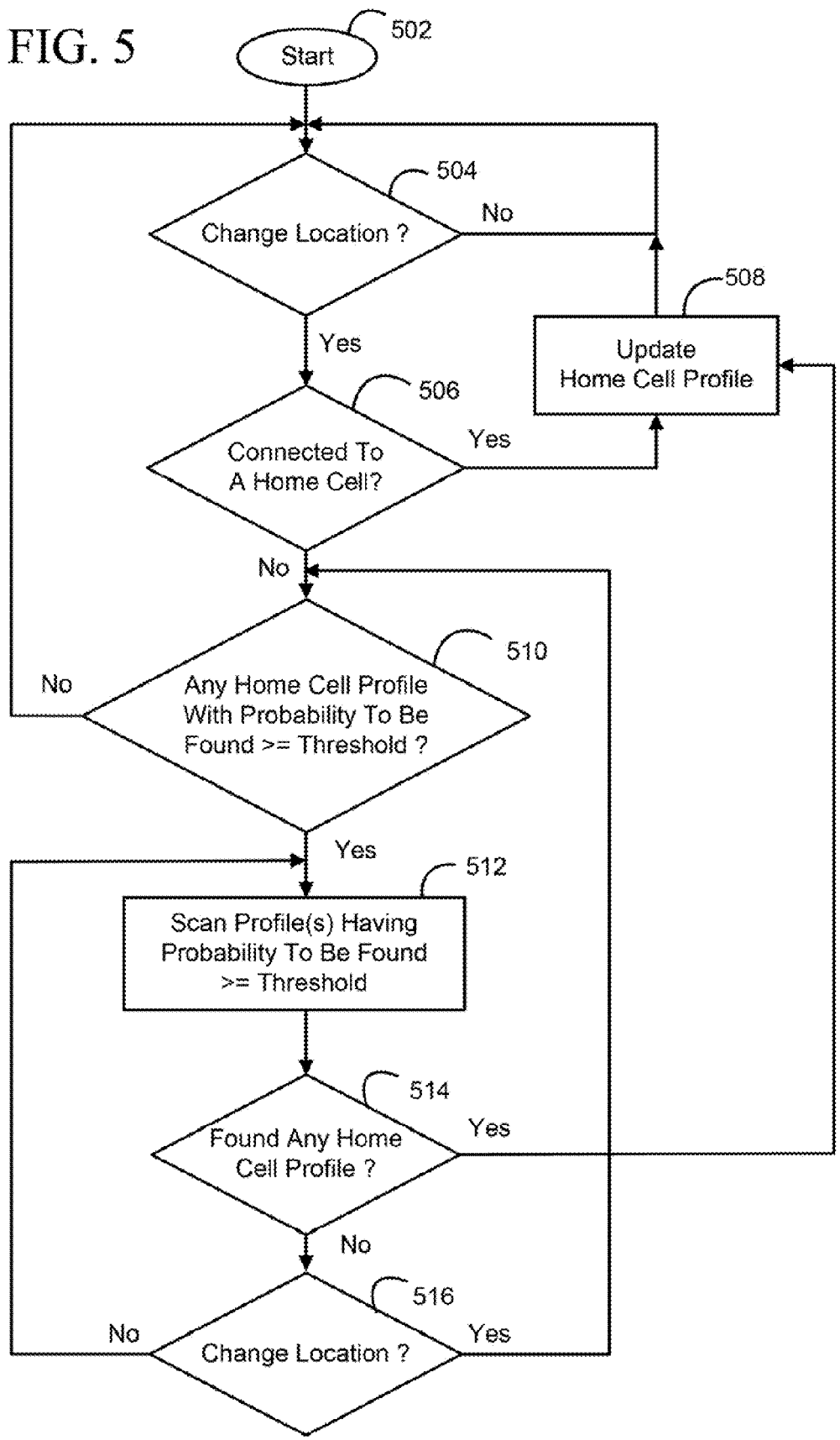

FIGS. 5, 6A, and 6B are flowcharts for describing a more detailed method related to the technique of FIG. 3A for controlling transceiver operation of the mobile device. The mobile communication device may be that which has been shown and described earlier in relation to FIG. 1 or 2, making use of one or more controllers or processors (e.g. microprocessor) to perform the techniques. The technique of FIGS. 5, 6A, and 6B may be embodied as a computer program product which includes a computer readable medium (e.g. memory or computer disk) and computer instructions stored in the computer readable medium. The computer instructions are executable by the one or more controllers or processors of a mobile device and adapted in accordance with the described steps or logic.

The technique refers to WLAN cells associated with WLANs having stored WLAN profiles. The mobile device is initially operating in a WWAN for communications, and has its WLAN transceiver portion in the low power state. Beginning at a start block 502 of FIG. 5, the mobile device detects or otherwise identifies whether it has undergone a change in location or other condition (step 504 of FIG. 5). If not, the mobile device continues to monitor for such condition. If the mobile device detects such condition in step 504, the mobile device identifies whether it is connected in a WLAN cell of one of the WLANs with which it has a stored WLAN profile (step 506 of FIG. 5). If connected in a WLAN cell, the mobile device updates its WLAN cell profile with any cell IDs of WWANs not already included in the WLAN profile (step 508 of FIG. 5). If not connected in any WLAN cell in step 506, the mobile device identifies whether any stored WLAN profile has a probability to be found that meets or exceeds a threshold (step 510 of FIG. 5). The probability to be found is based on the number or percentage of current WWAN cells that match the cell IDs stored in association with the home cell profile. If no in step 510, then the mobile device continues back at step 504.

If the probability exceeds the threshold in step 510, the mobile device enables its WLAN transceiver portion (if previously disabled) and causes one or more scanning operations to be performed with use of its WLAN transceiver portion (step 512 of FIG. 5). The mobile device performs this step to identify the WLAN which has the increased probability of being found. If the mobile device identifies the WLAN (step 514 of FIG. 5), the mobile device connects with it for communications and updates its WLAN profile with any cell IDs of WWANs not already included in the corresponding WLAN profile (step 508 of FIG. 5).

If the mobile device does not identify and connect with the WLAN in step 514, then the mobile device identifies whether it has changed its location (step 516 of FIG. 5). If the mobile device has not changed location as identified in step 516, the mobile device repeats the WLAN scanning operation at step 512; otherwise, the mobile device exits WLAN scanning and repeats processing steps of the flowchart starting again at step 510 where the probabilities of finding WLANs are reevaluated. Note that the mobile device may perform the WLAN scanning step 512 only for WLANs associated with the increased probability to be found (i.e. and not other WLANs not having the increased probability).

FIGS. 6A-6B is a flowchart for describing part of the method which may be performed in parallel with the method of FIG. 5. Beginning at a start block 602 of FIG. 6A, the mobile device performs a WWAN scanning operation, obtains WWAN cell identifications from the scanning operation, and moves and operates in one of the WWAN cells in the WWAN (step 604 of FIG. 6A). The mobile device takes a signal measurement (e.g. signal strength, or received signal strength indication "RSSI") for each cell. Based on this information, the mobile device creates and stores a list of "m" WWAN cells identifications, which include the WWAN serving cell and neighboring WWAN cell identifications, in descending order of signal strength (step 606 of FIG. 6A). In one embodiment, the mobile device includes a received cell identification in the list only if its corresponding cell has a signal strength that meets or exceeds a predetermined signal strength threshold, but otherwise excludes the received cell identification from the list.

The mobile device then identifies whether it is connected in a WLAN cell (i.e. one of its WLANs) (step 608 of FIG. 6A). If the mobile device is connected in a WLAN cell in step 608, the mobile device identifies whether the WLAN profile of the connected WLAN cell includes the serving cell ID of the WWAN serving cell (step 640 of FIG. 6A). If not, then the mobile device adds the serving cell ID of the serving cell to the WLAN profile (step 642 of FIG. 6A). If the serving cell ID is already included in the WLAN profile in step 640, or after step 642 is performed, the flowchart ends at an end block 644.

If the mobile device is not connected in a WLAN cell in step 608, the mobile device proceeds through a connector A to FIG. 6B and performs a series of steps for each one of a plurality of "t" WLAN profiles stored in its memory. Each series of steps for each WLAN profile may be performed in parallel or in series; in FIG. 6B, each series of steps is shown as being performed in parallel with the others. In particular, a series of steps 610, 612, 614, and 616 is performed for WLAN profile 1; a series of steps 620, 622, 624, and 626 is performed for WLAN profile 2; and so on, where a series of steps 630, 632, 634, and 636 is performed for WLAN profile t.

With respect to WLAN profile 1, beginning at step 610, the mobile device determines whether the number of matching WWAN cells in the list (i.e. the "current set") and the WLAN profile meets or exceeds a predetermined threshold "n". If not, the flowchart proceeds through a connector C back to FIG. 6A at end block 644. If the number of matching WWAN cells meets or exceeds the predetermined threshold n in step 610, the mobile device configures the scanning pattern for WLAN 1 (step 612 of FIG. 6B). The mobile device scans for WLAN 1 based on the information in the WLAN profile 1 (step 614 of FIG. 6B). If WLAN 1 is identified and available (step 616 of FIG. 6B), then the flowchart proceeds through a connector B back to FIG. 6A to step 640. If not, the mobile device continues to monitor to identify the availability of WLAN 1. As described earlier, the same series of steps are performed in steps 620, 622, 624, and 626 in relation to WLAN 2 and WLAN profile 2; and the same series of steps are performed in steps 630, 632, 634, and 636 in relation to WLAN t and WLAN profile t.

Figure 7:
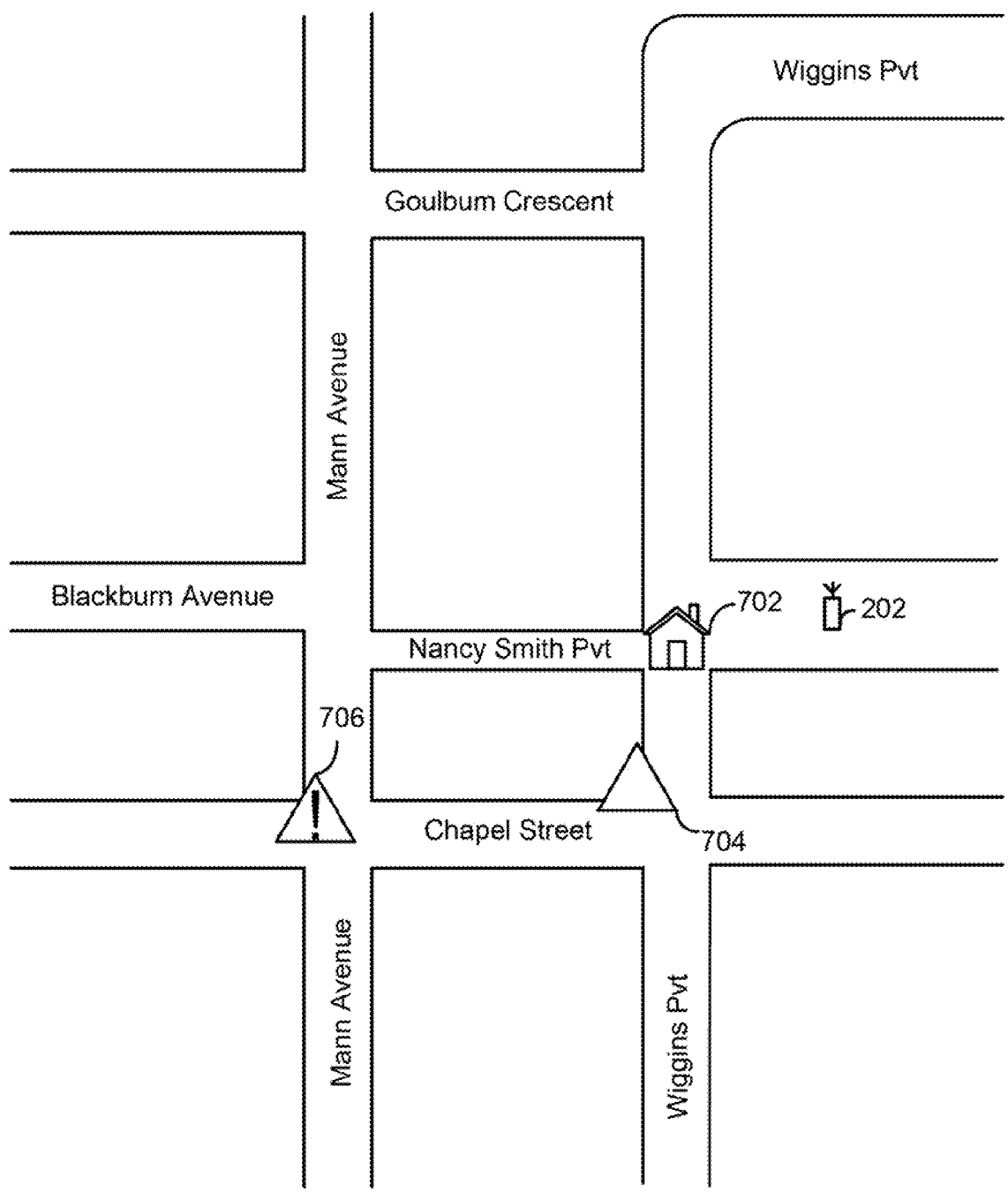
FIG. 7 is a map of a geographic region within which the mobile device may traverse during its operation, for an illustrative example of FIGS. 7-14.

Another illustrative example of the techniques as described in relation to FIGS. 3A, 5, and 6A-6B is now set forth in relation to FIGS. 7-14. FIG. 7 is a map of a geographic region 700 within which mobile device 202 may traverse during its operation. Geographic region 700 identifies various locations 702, 704, and 706 within a few square blocks. At the street intersection of Wiggins Pvt. and Nancy Smith Pvt., i.e. location 706, a residence is located, which is depicted as residence 850 in FIG. 8.

Figure 8:
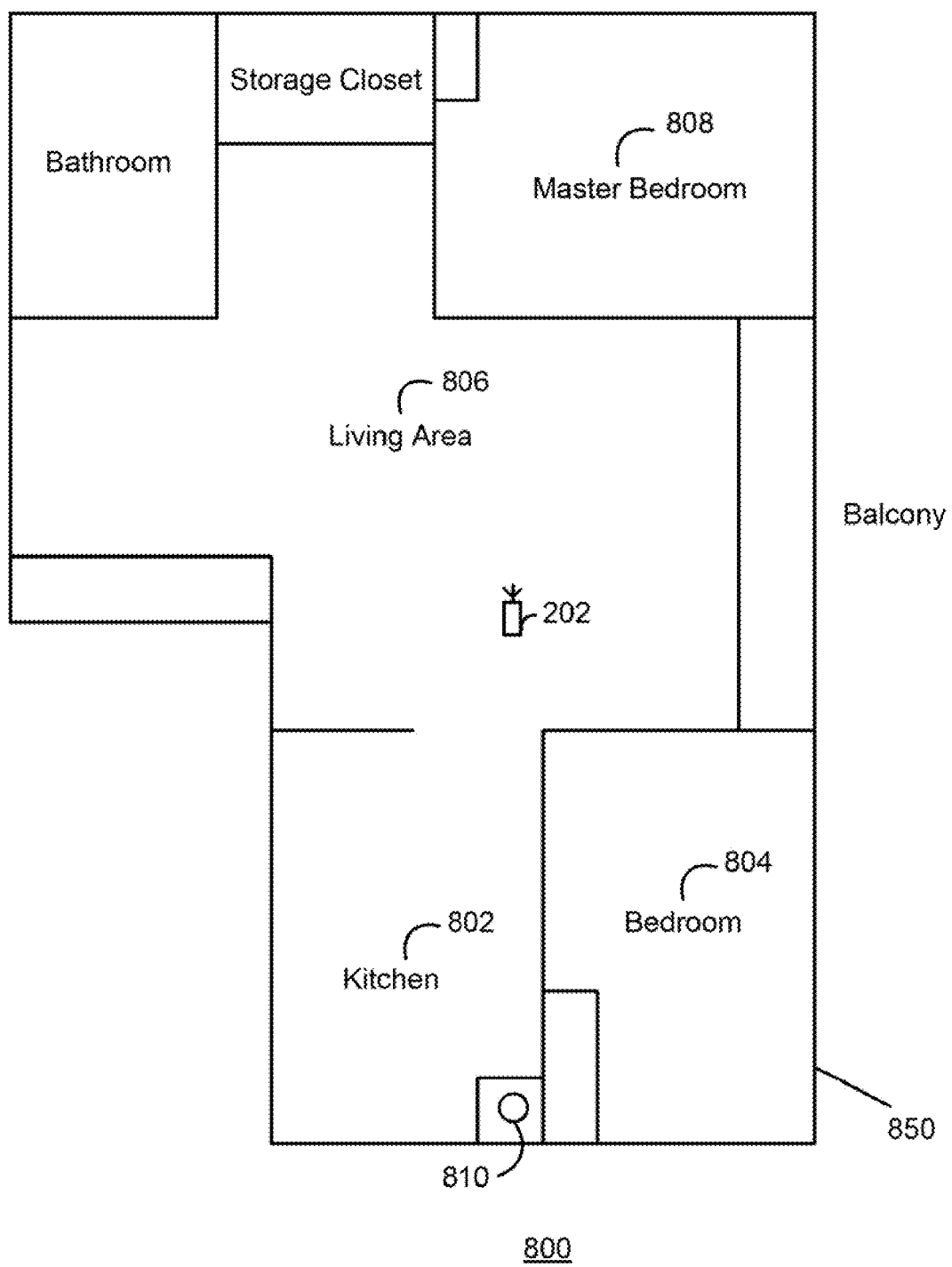
FIG. 8 is a map floor plan of a residence located in the geographic region of FIG. 7, which includes a WLAN in which the mobile device is adapted to operate.

In FIG. 8, it is revealed that residence 850 has a kitchen room/area 802, a bedroom area 804, a living room/area 806, and a master bedroom area 808. Kitchen area 802 includes a wireless AP 810 of a WLAN in which mobile device 202 is adapted to operate. Wireless coverage for communication is provided by wireless AP 810 in all areas 802, 804, 806, and 808.

However, especially as areas of residence 850 are facing different sides of the building, different WWAN cells of base stations are received in each different area 802, 804, 806, and 808. To illustrate, each figure in FIGS. 9-14 reveals cell information received by the mobile device from a WWAN scanning operation while traversing geographic region 700 of FIG. 7 and the various areas 802, 804, 806, and 808 within residence 850 of FIG. 8. More specifically, the cell information in FIGS. 9-14 corresponds to the following:

FIG. 9—kitchen area 802
FIG. 10—bedroom area 804
FIG. 11—living area 806
FIG. 12—master bedroom 808
FIG. 13—location 704, outside of residence 850
FIG. 14—location 70E, outside of residence 850

As apparent from FIGS. 9-14, the WWAN serving cell ("S" in the figures) of mobile device 202 and the WWAN neighboring cells ("E" or "G" in the figures) change depending on which area of residence 850 the mobile device 202 is located.

The cell information shown in FIGS. 9-14 includes various other data. In FIG. 9, for example, the "best" WWAN cell which serves mobile device 202 in kitchen area 802 corresponds to a base station having an absolute radio frequency channel number (ARFCN) or "frequency" of 140, a radio signal strength indication (RSSI) of −86 dBm, and a cell ID of 34093. The serving base station is identified with other information, such as a path loss criterion C1 of 22, a cell reselection criterion C2 of 26, a base station identity code (BSIC) of 12, and a routing area code (RAC) of 1.

With use of the present techniques, the stored set of cell IDs associated with the WLAN profile may be set with the following five (5) cell IDs:

Cell ID 34093 (serving cell in kitchen area 802), ARFCN 140
Cell ID 33992 (serving cell in bedroom area 804), ARFCN 137
Cell ID 33993 (serving cell in living area 806), ARFCN 134
Cell ID 23533 (serving cell in master bedroom 808), ARFCN 143
Cell ID 34103 (a relatively strong cell in general), ARFCN 136

Based on this stored set associated with the WLAN profile, the typical number of matching WWAN cells in each given area and the resulting WLAN operation state may be as follows:

Kitchen Area 802=4/5 WWAN cells=enable WLAN operation
Bedroom Area 804=5/5 WWAN cells=enable WLAN operation
Living Area 806=3/5 WWAN cells=enable WLAN operation
Bedroom Area 808=3/5 WWAN cells=enable WLAN operation
Location 706=3/5 WWAN cells=enable WLAN operation
Location 708=1/5 WWAN cells=disable WLAN operation where the predetermined threshold may be set at 60%, for example.

As apparent from the present techniques, since the WLAN transceiver portion need not be rigorously operated for scanning, enabled, or activated while WWAN communications take place, unnecessary operations are avoided. In addition, power consumption may be reduced and battery life may be increased.

Thus, methods and apparatus for use in controlling wireless transceiver operation in a mobile communication device which is adapted to operate for communications in WWAN and WLAN have been described. In one illustrative embodiment, the mobile device operates for communications via the WLAN with use of a WLAN transceiver portion. During such operation, the mobile device performs one or more scanning operations with use of a WWAN transceiver portion for identifying a set of cell site identifications corresponding to a plurality of base stations of one or more WWANs available in a coverage region of the WLAN. The set of cell site identifications is stored in association with a WEAN profile of the WLAN. Subsequently, while the mobile device operates for communications in a WWAN, the WLAN transceiver portion may be maintained in a low power state. During the WWAN operation, the mobile device performs one or more scanning operations with use of the WWAN transceiver portion for identifying a current set of cell site identifications corresponding to the currently-serving base station of the WWAN and one or more neighboring base stations. The mobile device compares cell site identifications of the current set with cell site identifications of the stored set, and identifies if the number or percentage of matching cell site identifications of the current and stored sets meets or exceeds a predetermined threshold. If the predetermined threshold is met or exceeded, the mobile device enables operation of the WLAN transceiver portion for communications via the WLAN; otherwise, the mobile device refrains from enabling operation of the WLAN transceiver portion for communications via the WLAN. This technique may be performed in association with each WLAN profile stored in the mobile device.

In another illustrative embodiment, the mobile device performs one or more scanning operations with use of the WLAN transceiver portion in a geographical region, but fails to connect with any WLANs in the geographical region. The mobile device also performs one or more scanning operations with use of the WWAN transceiver portion for identifying a set of cell site identifications corresponding to a plurality of base stations of one or more WWANs available in the geographical region. The set of cell site identifications is stored in association with an indication of the failure to connect with any WLANs in the geographic region. Subsequently, while operating for communications via a WWAN with use of the WWAN transceiver portion, the WLAN transceiver portion may be maintained in a low power state. During the WWAN operation, the mobile device performs one or more scanning operations with use of the WWAN transceiver portion for identifying a current set of cell site identifications. The current set of cell site identifications corresponds to the currently-serving base station of the WWAN and one or more neighboring base stations. The mobile device compares cell site identifications of the current set with cell site identifications of the stored set. If the mobile device identifies a predetermined condition where the number or percentage of matching cell site identifications of the current and stored sets meets or exceeds a predetermined threshold, it refrains from enabling operation of the WLAN transceiver portion for communications in a WLAN. This technique may be performed in association with each one of a plurality of geographic regions through which the mobile device traverses.

Although the detailed description focuses on the use of two specific networks (namely a cellular network as the WWAN and an IEEE 802.11 network as the WLAN), any two suitable heterogeneous networks may be utilized, where one of the networks has overlapping coverage with or is contained within the other network. For example, the WLAN may be an IEEE 802.11-based network and the WWAN may be an IEEE 802.16e-based network. As another example, the WLAN may be an IEEE 802.16e-based network and the WWAN may be the cellular network. Home Node-B cells of a 3G macro Radio Access Network (RAN) may be also utilized with cellular, IEEE 802.11, or IEEE 802.16 technologies in the same fashion. As apparent, the above-described embodiments of the present application are intended to be examples only. Those of skill in the art may effect alterations, modifications and variations to the embodiments without departing from the scope of the application.

What is claimed is:

1. A method in a mobile communication device configured to operate in a wireless wide area network (WWAN) and a wireless local area network (WLAN), the method comprising the acts of:

operating for communications via the WLAN with use of a WLAN transceiver portion;

performing one or more scanning operations with use of a WWAN transceiver portion for identifying a set of cell site identifications corresponding to a plurality of base stations of one or more WWANs available in a coverage region of the WLAN;

storing the set of cell site identifications in association with a WLAN profile which includes an identification of the WLAN;

while operating for communications via a WWAN with use of the WWAN transceiver portion:

maintaining the WLAN transceiver portion in a low power state;

performing one or more scanning operations with use of the WWAN transceiver portion for identifying a current set of cell site identifications, the current set of cell site identifications corresponding to a serving base station of the WWAN and one or more neighboring base stations of the mobile device;

comparing cell site identifications of the current set with cell site identifications of the stored set;
if the number or percentage of matching cell site identifications of the current and stored sets meets or exceeds a predetermined threshold, then exiting the WLAN transceiver portion from the low power state and enabling operation of the WLAN transceiver portion for identifying the WLAN for communications; and
otherwise, if the number or the percentage of the matching cell site identifications of the current and stored sets fails to meet or exceed the predetermined threshold, then maintaining the WLAN transceiver portion in the low power state.

2. The method of claim 1, wherein the act of enabling operation of the WLAN transceiver portion comprises the further act of enabling a scanning operation of the WLAN transceiver portion.

3. The method of claim 1, further comprising:
if the number or the percentage of matching cell site identifications of the current and stored sets meets or exceeds the predetermined threshold, then increasing a scanning rate for performing scanning operations with use of the WLAN transceiver portion.

4. The method of claim 1, further comprising:
if the number or the percentage of matching cell site identifications of the current and stored sets fails to meet or exceed the predetermined threshold, then refraining from enabling operation of the WLAN transceiver portion for communications via the WLAN.

5. The method of claim 1,
wherein the WWAN is a cellular telecommunications network.

6. The method of claim 1, further comprising:
again operating for communications via the WLAN with use of the WLAN transceiver portion; and
updating the stored set of cell site identifications associated with the WLAN profile of the WLAN with one or more newly-identified cell site identifications corresponding to one or more newly-identified base stations available in the coverage region of the WLAN.

7. The method of claim 1, wherein the WLAN is a first WLAN, the set of cell site identifications is a first set of cell site identifications corresponding to a first plurality of base stations, and the WLAN profile is a first WLAN profile, the method further comprising:
operating for communications via a second WLAN with use of the WLAN transceiver portion;
performing one or more scanning operations with use of the WWAN transceiver portion for identifying a second set of cell site identifications corresponding to a second plurality of base stations available in a coverage region of the second WLAN; and
storing the second set of cell site identifications in association with a second WLAN profile of the second WLAN.

8. The method of claim 7, further comprising:
while operating for communications via the WWAN with use of the WWAN transceiver portion:
comparing the cell site identifications of the current set with cell site identifications of the stored second set; and
if the number or percentage of matching cell site identifications of the current and second stored sets meets or exceeds a predetermined threshold, then enabling operation of the WLAN transceiver portion for communications via the second WLAN.

9. The method of claim 1 wherein the predetermined threshold is set to represent less than the number of the cell site identifications in the stored set.

10. The method of claim 1, wherein the WWAN is a cellular telecommunications network and the WLAN is an IEEE 802.11-based communication network.

11. The method of claim 1, implemented as a computer program product comprising a non-transitory computer readable medium having computer instructions executable on one or more processors of the mobile communication device.

12. A mobile communication device operative for communications in a wireless wide area network (WWAN) and a wireless local area network (WLAN), the mobile communication device comprising:
a WWAN transceiver portion configured to operate for communications with WWANs;
a WLAN transceiver portion configured to operate for communications with WLANs;
one or more processors coupled to the WWAN and WLAN transceiver portions;
memory coupled to the one or more processors;
the one or more processors being operative to:
operate for communications via a WLAN with use of the WLAN transceiver portion;
perform one or more scanning operations with use of the WWAN transceiver portion for identifying a set of cell site identifications corresponding to a plurality of base stations available in a coverage region of the WLAN;
store the set of cell site identifications in association with a WLAN profile which includes an identification of the WLAN;
while operating for communications via a WWAN with use of the WWAN transceiver portion:
maintain the WLAN transceiver portion in a low power state;
perform one or more scanning operations with use of the WWAN transceiver portion for identifying a current set of cell site identifications, the current set of cell site identifications corresponding to the currently-serving base station of the WWAN and one or more neighboring base stations;
compare cell site identifications of the current set with cell site identifications of the stored set;
if the number or percentage of matching cell site identifications of the current and stored sets meets or exceeds a predetermined threshold, then exit the WLAN transceiver portion from the low power state and enable operation of the WLAN transceiver portion for identifvina the WLAN for communications; and
otherwise, if the number or the percentage of the matching cell site identifications of the current and stored sets fails to meet or exceed the predetermined threshold, then maintain the WLAN transceiver portion in the low power state.

13. The mobile communication device of claim 12, wherein the one or more processors are further operative to enable operation of the WLAN transceiver portion by enabling a scanning operation of the WLAN transceiver portion.

14. The mobile communication device of claim 12, wherein the one or more processors are further operative to:
if the number or the percentage of matching cell site identifications of the current and stored sets meets or exceeds the predetermined threshold, then increase a scanning rate for performing scanning operations with use of the WLAN transceiver portion.

15. The mobile communication device of claim 12, wherein the predetermined threshold is set to be less than 100%.

16. The mobile communication device of claim 12, wherein
wherein the WWAN is a cellular telecommunications network.

17. The mobile communication device of claim 12, wherein the WLAN is a first WLAN, the set of cell site identifications is a first set of cellsite identifications corresponding to a first plurality of base stations, and the WLAN profile is a first WLAN profile, and where the one or more processors are further operative to:
   operate for communications via a second WLAN with use of the WLAN transceiver portion;
   perform one or more scanning operations with use of the WWAN transceiver portion for identifying a second set of cell site identifications corresponding to a second plurality of base stations available in a coverage region of the second WLAN; and
   store the second set of cell site identifications in association with a second WLAN profile of the second WLAN.

18. The mobile communication device of claim 17, wherein the one or more processors are further operative to:
   while providing operation for communications via the WWAN with use of the WWAN transceiver portion:
      compare the cell site identifications of the current set with WWAN identifications of the stored second set; and
      if the number or percentage of matching cell site identifications of the current and second stored sets meets or exceeds a predetermined threshold, then enable operation of the WLAN transceiver portion for communications via the second WLAN.

19. The mobile communication device of claim 12, wherein the predetermined threshold is set to represent less than the number of the WLAN identifications in the stored set.

20. The mobile communication device of claim 12, wherein the WWAN is a cellular telecommunications network and the WLAN is an IEEE 802.11-based communication network.

21. A communication system, comprising:
   one or more wireless wide area networks (WWANs);
   a wireless local area network (WLAN);
   one or more mobile communication devices configured to operate for communications in both the WLAN and the WWANs;
   each mobile communication device being operative to:
      operate for communications via the WLAN with use of a WLAN transceiver portion;
      perform one or more scanning operations with use of a WWAN transceiver portion for identifying a set of cell site identifications corresponding to a plurality of base stations of one or more WWANs available in a coverage region of the WLAN;
      store the set of cell site identifications in association with a WLAN profile which includes an identification of the WLAN;
      while operating for communications via the WWAN with use of the WWAN transceiver portion:
         maintain the WLAN transceiver portion in a low power state:
         perform one or more scanning operations with use of the WWAN transceiver portion for identifying a current set of cell site identifications, the current set of cell site identifications corresponding to the currently-serving base station of the WWAN and one or more neighboring base stations;
         compare cell site identifications of the current set with cell site identifications of the stored set;
         if the number or percentage of matching cell site identifications of the current and stored sets meets or exceeds a predetermined threshold, then exit the WLAN transceiver portion from the low power state and enable operation of the WLAN transceiver portion for identifying the WLAN for communications; and
      otherwise, if the number or the percentage of the matching cell site identifications of the current and stored sets fails to meet or exceed the predetermined threshold, then maintain the WLAN transceiver portion in the low power state.

22. A method in a mobile communication device which is adapted to communicate in a wireless wide area network (WWAN) and a wireless local area network (WLAN), the method comprising:
   performing one or more scanning operations with use of a WLAN transceiver portion in a geographical region;
   failing to connect with any WLANs in the geographical region;
   performing one or more scanning operations with use of a WWAN transceiver portion for identifying a set of cell site identifications corresponding to a plurality of base stations available in the geographical region;
   storing the set of cell site identifications in association with an indication of the failure to connect with any WLANs in the geographic region;
   while operating for communications via a WWAN with use of the WWAN transceiver portion:
      performing one or more scanning operations with use of the WWAN transceiver portion for identifying a current set of cell site identifications, the current set of cell site identifications corresponding to the currently-serving base station of the WWAN and one or more neighboring base stations;
      comparing cell site identifications of the current set with cell site identifications of the stored set;
      if the number or percentage of matching cell site identifications of the current and stored sets meets or exceeds a predetermined threshold, then setting the WLAN transceiver portion in a low power state; and
      otherwise, if the number or the percentage of the matching cell site identifications of the current and stored sets fails to meet or exceed the predetermined threshold, then maintaining the WLAN transceiver portion in an enabled state of operation.

23. A mobile communication device operative for communications in a wireless wide area network (WWAN) and a wireless local area network (WLAN), the mobile communication device comprising:
   a WWAN transceiver portion configured to operate for communications with WWANs;
   a WLAN transceiver portion configured to operate for communications with WLANs;
   one or more processors coupled to the WWAN and WLAN transceiver portions;
   memory coupled to the one or more processors;
   the one or more processors being operative to:
      operate for communications via a first WLAN with use of the WLAN transceiver portion;

perform one or more scanning operations with use of the WWAN transceiver portion for identifying a first set of cell site identifications corresponding to a first plurality of base stations available in a coverage region of the first WLAN;

store the first set of cell site identifications in association with a first WLAN profile which includes an identification of the first WLAN;

operate for communications via a second WLAN with use of the WLAN transceiver portion;

perform one or more scanning operations with use of the WWAN transceiver portion for identifying a second set of cell site identifications corresponding to a second plurality of base stations available in a coverage region of the second WLAN;

store the second set of cell site identifications in association with a second WLAN profile which includes an identification of the second WLAN;

while operating for communications via a WWAN with use of the WWAN transceiver portion:

perform one or more scanning operations with use of the WWAN transceiver portion for identifying a current set of cell site identifications, the current set of cell site identifications corresponding to the currently-serving base station of the WWAN and one or more neighboring base stations;

compare cell site identifications of the current set with cell site identifications of the first stored set and, if the number or percentage of matching cell site identifications of the current and the first stored sets meets or exceeds a predetermined threshold, then enable operation of the WLAN transceiver portion for identifying the first WLAN for communications; and compare cell site identifications of the current set with cell site identifications of the second stored set and, if the number or percentage of matching cell site identifications of the current and the second stored sets meets or exceeds the predetermined threshold, then enable operation of the WLAN transceiver portion for identifying the second WLAN for communications.

24. The mobile communication device of claim 23, wherein the WWAN is a cellular telecommunications network.

25. The mobile communication device of claim 23, wherein the WWAN is a cellular telecommunications network and the first and the second WLANs are IEEE 802.11-based networks.

26. The mobile communication device of claim 23, wherein the one or more processors are further operative to:

while providing operation for communications via the WWAN with use of the WWAN transceiver portion, maintain the WLAN transceiver portion in a. low power state;

if the number or the percentage of the matching cell site identifications of the current and the first stored sets meets or exceeds the predetermined threshold, then exit the WLAN transceiver portion from the low power state and enable operation of the WLAN transceiver portion for identifying the first WLAN for communications;

if the number or the percentage of the matching cell site identifications of the current and the second stored sets meets or exceeds the predetermined threshold, then exit the WLAN transceiver portion from the low power state and enable operation of the WLAN transceiver portion for identifying the second WLAN for communications; and if the number or the percentage of the matching cell site identifications of the current set and the first or the second stored sets fails to meet or exceed the predetermined threshold, then maintain the WLAN transceiver portion in the low power state.

* * * * *

UNITED STATES PATENT AND TRADEMARK OFFICE
CERTIFICATE OF CORRECTION

| | | |
|---|---|---|
| PATENT NO. | : 8,254,985 B2 | Page 1 of 1 |
| APPLICATION NO. | : 12/612046 | |
| DATED | : August 28, 2012 | |
| INVENTOR(S) | : Ozgur Ekici | |

It is certified that error appears in the above-identified patent and that said Letters Patent is hereby corrected as shown below:

Title Page,

In section 12, change "Ekicl et al." to --Ekici et al.--.

In section 75, change "Ozgur Ekicl" to --Ozgur Ekici--.

Signed and Sealed this
Ninth Day of October, 2012

David J. Kappos
*Director of the United States Patent and Trademark Office*